US010509617B2

(12) United States Patent
Miki

(10) Patent No.: US 10,509,617 B2
(45) Date of Patent: Dec. 17, 2019

(54) TERMINAL DEVICE, PROGRAM, METHOD FOR SHARING CONTENT AND INFORMATION PROCESSING SYSTEM

(71) Applicant: Morio Miki, Kanagawa (JP)

(72) Inventor: Morio Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 15/307,402

(22) PCT Filed: Jun. 4, 2015

(86) PCT No.: PCT/JP2015/066799
§ 371 (c)(1),
(2) Date: Oct. 28, 2016

(87) PCT Pub. No.: WO2015/198869
PCT Pub. Date: Dec. 30, 2015

(65) Prior Publication Data

US 2017/0052755 A1 Feb. 23, 2017

(30) Foreign Application Priority Data

Jun. 23, 2014 (JP) ................................ 2014-128322
Apr. 9, 2015 (JP) ................................ 2015-080170

(51) Int. Cl.
*G06F 3/048* (2013.01)
*G06F 3/14* (2006.01)
(Continued)

(52) U.S. Cl.
CPC .......... *G06F 3/1454* (2013.01); *G06F 3/0482* (2013.01); *G06F 3/0484* (2013.01);
(Continued)

(58) Field of Classification Search
CPC ........................................ H04L 12/1813–1831
See application file for complete search history.

(56) References Cited

U.S. PATENT DOCUMENTS 8,743,022 B2 6/2014 Masuda et al.
2005/0075919 A1* 4/2005 Kim ................ G06Q 10/06316 705/7.26
(Continued)

FOREIGN PATENT DOCUMENTS

JP 2011-238178 11/2011
JP 2011-244319 12/2011
(Continued)

OTHER PUBLICATIONS

NetSupport: "NetSupport School—Classroom Instruction and Monitoring solution : Product Overview", YouTube, Sep. 3, 2012, pp. 1-1, Retrieved from the Internet: URL: https://www.youtube.com/watch?v=e4g3Dqg6Dnc [retrieved on Mar. 2, 2017] Minutes 6:30, 9:00, 32:00-34:00.
(Continued)

*Primary Examiner* — Keith D Bloomquist
(74) *Attorney, Agent, or Firm* — IPUSA, PLLC

(57) ABSTRACT

There is provided a terminal device for sharing first content to be displayed with another terminal device, comprising: a first content display unit configured to display the first content based on information sent from the other terminal device so that the displayed image of the first content is shared with the other terminal device; a role determining unit configured to determine a role of the terminal device among a plurality of roles that are respectively played by one or more of the terminal devices; and a second content display unit configured to display second content associated with the first content based on a display order for displaying the second content, by acquiring the second content from a second content storage place corresponding to the determined role, wherein the second content to be displayed varies according to the role of the terminal device.

20 Claims, 19 Drawing Sheets

(51) Int. Cl.

| | |
|---|---|
| ***H04L 12/18*** | (2006.01) |
| ***G06Q 10/10*** | (2012.01) |
| ***G06F 3/0482*** | (2013.01) |
| ***G06F 3/0484*** | (2013.01) |
| ***G09B 7/06*** | (2006.01) |
| ***H04L 29/06*** | (2006.01) |
| *H04L 29/08* | (2006.01) |

(52) U.S. Cl.
CPC ............... *G06Q 10/10* (2013.01); *G09B 7/06* (2013.01); *H04L 12/1813* (2013.01); *H04L 12/1831* (2013.01); *H04L 65/403* (2013.01); *H04L 67/10* (2013.01)

(56) References Cited

U.S. PATENT DOCUMENTS

| | | | | |
|---|---|---|---|---|
| 2006/0015519 | A1* | 1/2006 | LaBrosse | G06Q 10/10 |
| 2007/0286387 | A1 | 12/2007 | Fuse et al. | |
| 2010/0228599 | A1* | 9/2010 | Mamorsky | G06Q 10/00 705/7.36 |
| 2011/0149809 | A1* | 6/2011 | Narayanaswamy | H04L 12/1818 370/260 |
| 2011/0150200 | A1 | 6/2011 | Uhler et al. | |
| 2011/0184935 | A1* | 7/2011 | Marlin | G06Q 50/10 707/719 |
| 2011/0307788 | A1 | 12/2011 | Cheung et al. | |
| 2013/0103454 | A1* | 4/2013 | Agle | G06Q 10/0635 705/7.28 |
| 2014/0359023 | A1* | 12/2014 | Homsany | H04L 51/08 709/206 |
| 2015/0153996 | A1 | 6/2015 | Miki | |
| 2015/0271206 | A1* | 9/2015 | Schultz | H04L 12/1827 726/3 |

FOREIGN PATENT DOCUMENTS

| | | |
|---|---|---|
| JP | 2012-108872 | 6/2012 |
| JP | 2013-182431 | 9/2013 |
| JP | 2013-535056 | 9/2013 |
| JP | 2013-232819 | 11/2013 |

OTHER PUBLICATIONS

Anonymous: "XMPP—Wikipedia", Jun. 12, 2014, Retrieved from the Internet: URL: https://en.wikipedia.org/w/index.php?title=XMPP&oldid=612663575 [retrieved on Mar. 1, 2017] p. 1, paragraph 1, p. 5, paragraph 1-paragraph 4.

Extended European Search Report for 15812473.5 dated Mar. 20, 2017.

International Search Report dated Aug. 25, 2015 in PCT/JP2015/066799 filed on Jun. 4, 2015.

* cited by examiner

FIG.5

| Conference Identifier | Conference Name | Scheduled Date/Hour | Administrator Identifier | Conference Password |
|---|---|---|---|---|
| K001 | Sales Strategy Conference | 8/01/2014 09:30 | operator | eigyo1 |
| K002 | Marketing Conference | 8/01/2014 10:00 | operator1\|operator2 | market2 |

FIG.6

| Material Identifier | Conference Identifier | Material Name | Type | URI |
|---|---|---|---|---|
| S001 | K001 | Sales 1 | PDF | https://10.61.52.177/doc/s001.pdf |
| S002 | K001 | Sales 2 | PPT | https://10.61.52.177/doc/s002.ppt |
| S003 | K002 | Marketing | DOC | https://10.61.52.177/doc/s003.doc |

FIG.7

| Questionnaire Identifier | Material Identifier | Questionnaire Name | Answer Screen URI | Summary Screen URI |
|---|---|---|---|---|
| A001 | S001 | Comprehension Check | https://10.61.52.177/answer/a001.html | https://10.61.52.177/chart/a001.html |
| A002 | S002 | Questionnaire | https://10.61.52.177/answer/a002.html | https://10.61.52.177/chart/a002.html |
| A003 | S003 | Comprehension Check | https://10.61.52.177/answer/a003.html | https://10.61.52.177/chart/a003.html |
| A004 | S003 | Questionnaire | https://10.61.52.177/answer/a004.html | https://10.61.52.177/chart/a004.html |

FIG.8

| Role Name | Role Identifier | Page Synchronization | Handwritten Memo Synchronization | Start/End Questionnaire | Destination |
|---|---|---|---|---|---|
| Presenter | 1 | Positive | Positive | Positive | Summary Screen URI |
| Participant | 2 | Negative | Negative | Negative | Answer Screen URI |
| Administrator | 3 | Negative | Negative | Positive | Summary Screen URI |

FIG.10

```
- <message guid="26fabebc-6d61-4ed4-9c1b-958c5e035768" class="Questionnaire Information" to="Participant" from="Conference Server">
  - <body>
    - <Material>
        <Material Identifier>0</Material Identifier>
      - <Questionnaire>
          <Number Of Questionnaires>2</Number Of Questionnaires>
        - <Questionnaire Detail Information>
            <Questionnaire Identifier>a123</Questionnaire Identifier>
            <Title>Vitamin Quiz</Title>
            <Questionnaire Answer URI >https://10.61.52.177/answer/a123.html/</Questionnaire Answer URI >
            <Questionnaire Summary URI>https://10.61.52.177/chart/a123.html/</Questionnaire Summary URI>
          </Questionnaire Detail Information>
        - <Questionnaire Detail Information>
            <Questionnaire Identifier>a124</Questionnaire Identifier>
            <Title>Observation Quiz</Title>
            <Questionnaire Answer URI >https://10.61.52.177/answer/a124.html/</Questionnaire Answer URI >
            <Questionnaire Summary URI>https://10.61.52.177/chart/a124.html/</Questionnaire Summary URI>
          </Questionnaire Detail Information>
        </Questionnaire>
      </Material>
    - <Material>
        <Material Identifier>1</Material Identifier>
      - <Questionnaire>
          <Number Of Questionnaires>1</Number Of Questionnaires>
        - <Questionnaire Information>
            <Questionnaire Identifier>a200</Questionnaire Identifier>
            <Title>LectureQuestionnaire</Title>
            <Questionnaire Answer URI >https://10.61.52.177/answer/a200.html/</Questionnaire Answer URI >
            <Questionnaire Summary URI>https://10.61.52.177/chart/a200.html/</Questionnaire Summary URI>
          </Questionnaire Information>
        </Questionnaire>
      </Material>
    - <Role Information>
      - <Role>
          <Identifier>1</Identifier>
          <Name>Presenter</Name>
          <URI>Questionnaire Summary URI</URI>
        </Role>
      - <Role>
          <Identifier>2</Identifier>
          <Name>Participant</Name>
          <URI>Questionnaire Answer URI </URI>
        </Role>
      - <Role>
          <Identifier>3</Identifier>
          <Name>Administrator</Name>
          <URI>Questionnaire Summary URI</URI>
        </Role>
      </Role Information>
    </body>
  </message>
```

1000

1002

| ADMINISTRATOR | PRESENTER/PARTICIPANT |
|---|---|
| 1=ADMINISTRATOR<br>0=NOT ADMINISTRATOR | 1=PRESENTER<br>0=PARTICIPANT |

FIG.17

```
- <message class="Questionnaire Start"from="Presenter"to="Conference Server"guid="54eb54b5-c9a1-44cd-b568-b1318f3d665e">
    <body>123</body>
  </message>
```

TERMINAL DEVICE, PROGRAM, METHOD FOR SHARING CONTENT AND INFORMATION PROCESSING SYSTEM

TECHNICAL FIELD

The present technology relates to a terminal device, a program, a method for sharing content and an information processing system.

BACKGROUND ART

An electronic conference system, in which a questionnaire set by an information processing terminal of a presenter is distributed to information processing terminals of participants and thereby receiving answers from information processing terminals of the participants, is conventionally used.

An information processing apparatus is known, which includes storage means for storing handouts presented for an audience, setting means for accepting setting on a delivery timing of questionnaires associated with any part of the handouts, determination means for determining whether the set delivery timing comes in association with the processing on the handouts by a presenter, delivery means for delivering the corresponding questionnaires when the delivery timing comes, and answer means for accepting an answer for the questionnaires (for example, Japanese Laid-open Patent Publication No. 2011-238178).

In the conventional electronic conference system where the questionnaires are distributed, the setting for associating the distribution timing with any part of the handouts has been accepted, thereby distributing the questionnaires when the distribution timing comes according to procession of the presentation. Therefore, in the conventional electronic conference system, it is not possible to change the content of the questionnaires according to operations of the presenter, participants, etc., permitted in the information processing terminal.

As well as the electronic conference system for distributing the questionnaires, an information processing system also has such a problem to be solved, in which a plurality of terminal devices for displaying a content to be shared (hereinafter referred to as objective content) also display a content (hereinafter, referred to as related content) other than the content to be shared.

RELATED ART DOCUMENT

Patent Document

[Patent Document 1]: Japanese Laid-open Patent Publication No. 2011-238178

DISCLOSURE OF THE INVENTION

Problems to be Solved by the Invention

An object of disclosure of the present technology is to provide a terminal device, a program, a method for sharing content and an information processing system capable of displaying the related content in accordance with the operators of the terminal devices.

Means for Solving the Problems

According to an embodiment of the present invention, there is provided a terminal device for sharing first content to be displayed with another terminal device, comprising: a first content display unit configured to display the first content based on information sent from the other terminal device so that the displayed image of the first content is shared with the other terminal device; a role determining unit configured to determine a role of the terminal device among a plurality of roles that are respectively played by one or more of the terminal devices; and a second content display unit configured to display second content associated with the first content based on a display order for displaying the second content, by acquiring the second content from a second content storage place corresponding to the determined role, wherein the second content to be displayed varies according to the role of the terminal device.

Effects of the Present Invention

According to the disclosed technology, related content according to respective operators of terminal devices can be displayed.

BRIEF DESCRIPTION OF THE DRAWINGS

FIG. 5 is a diagram for illustrating an example structure of conference information;

FIG. 6 is a diagram for illustrating an example structure of material information;

FIG. 7 is a diagram for illustrating an example structure of questionnaire information;

FIG. 8 is a diagram for illustrating an example structure of role information;

FIG. 10 is a diagram for illustrating an example structure of the questionnaire information received by the conference client apparatus;

FIG. 17 is an illustration diagram for showing an example of a questionnaire start order;

MODE FOR CARRYING OUT THE INVENTION

Herein below, embodiments will be described with reference to accompanying drawings.

First Embodiment

System Configuration

Figure 1:
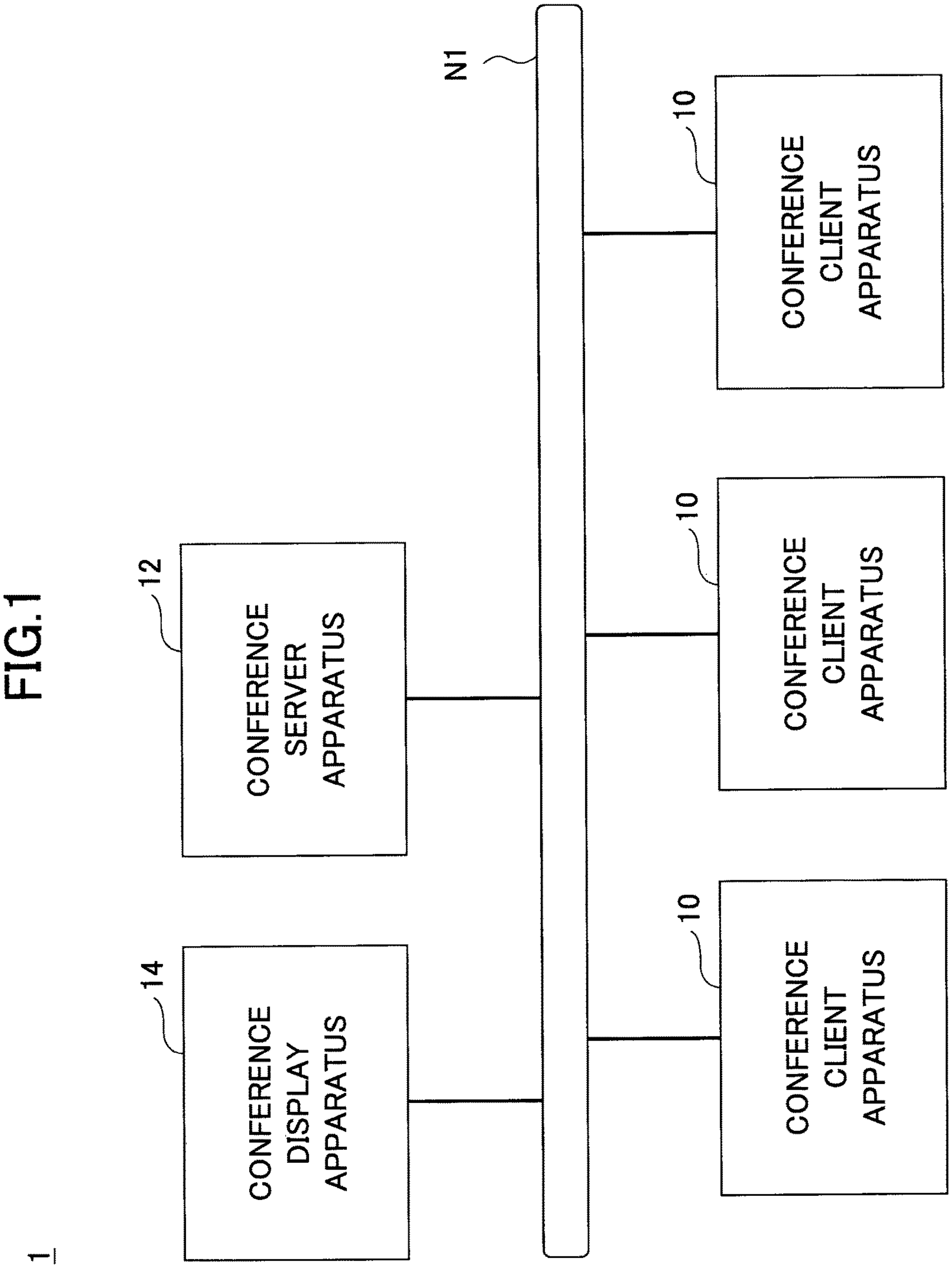
FIG. 1 is a block diagram for illustrating an example of a configuration of an electronic conference system of the present embodiment.

FIG. 1 is a block diagram for illustrating an example of a configuration of an electronic conference system of the present embodiment. In FIG. 1, an example configuration of the electronic conference system 1 is shown, in which a plurality of conference client apparatuses 10, a conference server apparatus 12 and a conference display apparatus 14 are connected with a network N1 which is a LAN or the like.

The conference server apparatus 12 has a function for managing conference information, conference material and the like as well as a function for convening the electronic conference, controlling participation in the electronic conference system, and distributing in real time operations input by a presenter of the electronic conference to the conference client apparatuses 10 participating in the electronic conference.

The conference server apparatus 12 can be realized by software or service performed in a computer. Also, the conference server apparatus 12 may be realized by software or service performed in a plurality of computers. Further, for example, the conference server apparatus 12 may be realized by using a so called cloud service. Additionally, the conference server apparatus 12 may only include functions for performing a conference server process and may be realized by various hardware configurations.

The conference client apparatus 10 has a function for receiving conference information, the conference material, etc. from the conference server apparatus 12, a function for accepting operations of the presenter or participants of the electronic conference required for proceeding with the electronic conference, a function for showing the conference material, and the like. The operators such as the presenter or the participants of the electronic conference can participate in the electronic conference by using the conference client apparatus 10.

The conference client apparatus 10 may be a PC, a tablet terminal, a mobile information terminal such as smartphone, mobile phone or PDA, a conference specific terminal, an electronic whiteboard, or an image forming apparatus such as a MFP or a printer. The conference client apparatus 10 receives the operation input in real time by the presenter from the conference server apparatus 12 while participating in the electronic conference, and shares display screens with other conference client apparatuses 10.

Additionally, one of the conference client apparatuses 10 is operated by the presenter, and can be used to request the conference server apparatus 12 to start or end the electronic conference. The conference client apparatus 10 can be switched to two types of operation mode, which are a share mode and an individual mode. For example, in the share mode, the conference material displayed in the conference client apparatus 10 of the presenter is displayed on the display screen of the conference client apparatuses 10 of the participants in synchronization with the procession of the presentation. For example, pages of the conference material, handwriting on the conference material (handwritten memo), and a pointer indicating a part of the conference material are synchronously displayed.

Also, in the individual mode, regardless of the procession of the presentation by the presenter, the conference material can be independently displayed on the display screen of the conference client apparatuses 10 of the participants (asynchronously displayed). The conference material is an example of objective content to which input operations (such as change of the page or addition of handwritten memo) are accepted.

The conference display apparatus 14 is an example of an output apparatus placed in a conference room, for example, to show the conference material in a large screen. The conference display apparatus 14 may be a display apparatus such as an electronic whiteboard or projection apparatus such as a projector.

Additionally, the electronic conference system 1 shown in FIG. 1 is an example, and all of the apparatuses shown in FIG. 1 are not always required. For example, in the electronic conference system 1, the function of the conference server apparatus 12 may be replaced with the functions of one or more conference client apparatuses 10. Additionally, the electronic conference system 1 may be configured without including the conference display apparatus 14.

Further, the electronic conference system 1 may be reconfigured by replacing a part of functions of the conference server apparatus 12 with the function of another apparatus. For example, a questionnaire server having a function for handling questionnaires may be included in the electronic conference system shown in FIG. 1.

<Hardware Configuration>

Figure 2:
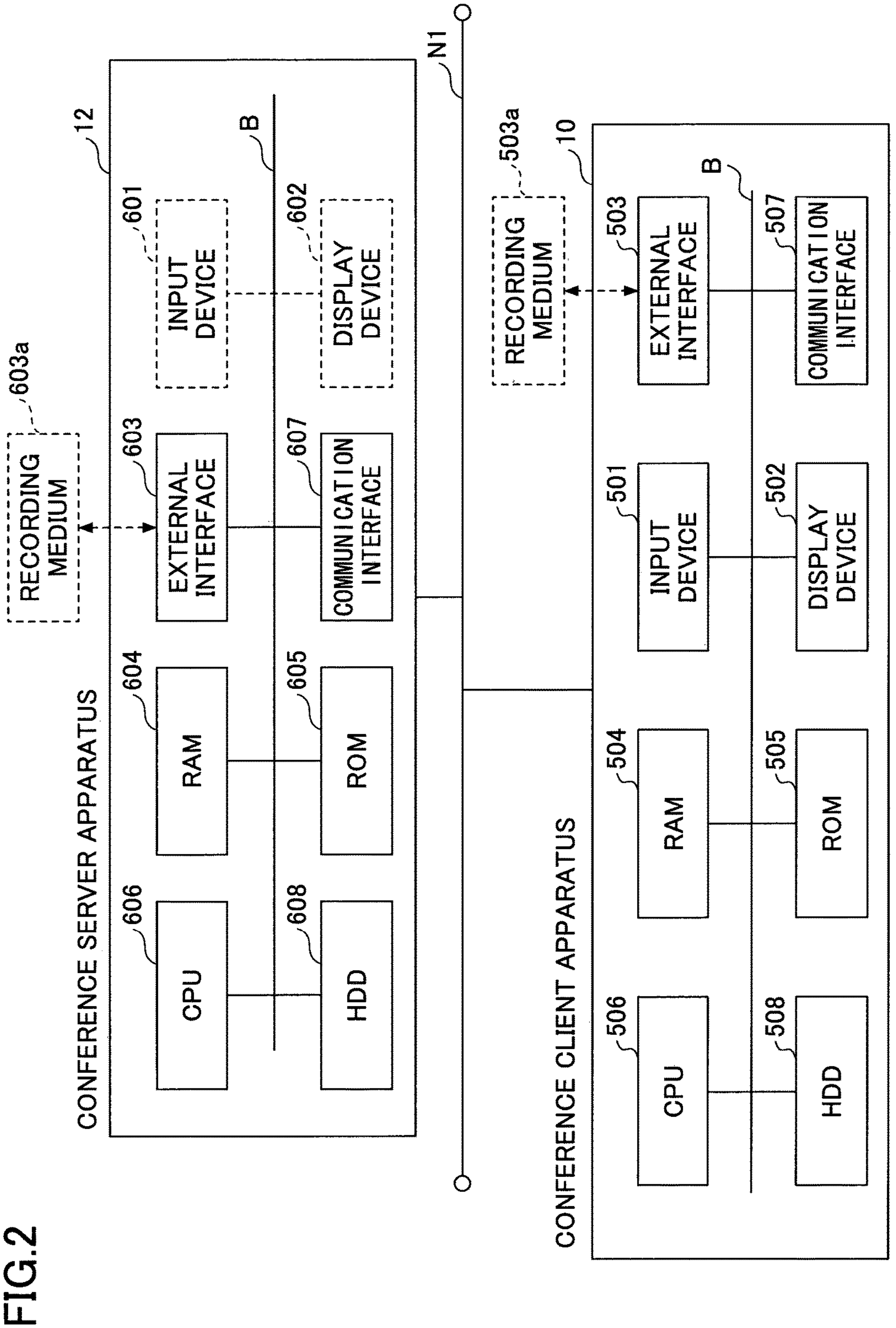
FIG. 2 is a block diagram for illustrating a hardware configuration of a computer included in the electronic conference system.

For example, the conference client apparatus 10 and the conference server apparatus 12 respectively have a hardware configuration shown in FIG. 2.

FIG. 2 is a block diagram for illustrating a hardware configuration of a computer included in the electronic conference system. The conference client apparatus 10 shown in FIG. 2 includes an input device 501, a display device 502, an external interface 503, a RAM 504, a ROM 505, a CPU 506, a communication interface 507, a HDD 508, etc., respectively connected with each other through the bus B. Additionally, the conference client apparatus 10 may include a camera, a microphone, a speaker and the like.

The input device 501 includes a keyboard, a mouse, a touch screen, and the like, and is used for inputting operation signals. Also, the display device 502 includes a display and the like, and displays processing results of the conference client apparatus 10. The communication interface 507 is an interface for connecting the conference client apparatus 10 with the network N1. The conference client apparatus 10 can perform data communication with the conference server apparatus 12 through the communication interface 507.

The HDD 508 is a nonvolatile storage device for storing programs or data. The basic software for controlling the entire conference client apparatus 10 that is an OS, and application software for providing functions on the OS exemplify the programs or data to be stored in the HDD 508. Also, in the HDD 508, the programs or data are managed by using a certain file system and/or a DB.

The external interface 503 is an interface to an external device. A recording medium 503*a* exemplifies the external device. Thus, the conference client apparatus 10 can read/write the data stored in the recording medium 503*a* through the external interface 503. A flexible disk, a CD, a DVD, a SD memory card, a USB memory stick, and the like exemplify the recording medium 503*a*.

The ROM 505 is a nonvolatile semiconductor storage device capable of holding data even when power is turned off. In the ROM 505, programs and data such as BIOS, OS settings, or network settings are stored, which are executed in starting the conference client apparatus 10. The RAM 504 is a volatile semiconductor storage device for temporarily holding programs or data.

The CPU 506 is a processor which retrieves the programs and the data stored in storage devices such as the ROM 505 or the HDD 508 to load them in the RAM 504 and execute them, thereby achieving control or functions of the entire conference client apparatus 10.

The conference client apparatus 10 can perform the processes described later, for example, by executing the programs in the above described hardware configuration.

The conference server apparatus 12 shown in FIG. 2 includes an input device 601, a display device 602, an external interface 603, a RAM 604, a ROM 605, a CPU 606, a communication interface 607, a HDD 608, etc., respectively connected with each other through the bus B. Additionally, the input device 601 and the display device 602 may be connected only if needed.

The input device 601 includes a keyboard, a mouse and the like, and is used for inputting operation signals to the conference server apparatus 12. Also, the display device 602 includes a display and the like, and displays processing results of the conference server apparatus 12.

The communication interface 607 is an interface for connecting the conference client apparatus 12 with the network N1. The conference server apparatus 12 can perform data communication with the conference client apparatus 10 through the communication interface 607.

The HDD 608 is a nonvolatile storage device for storing programs or data. The basic software for controlling the entire conference server apparatus 12 that is an OS, and application software for providing functions on the OS exemplify the programs or data to be stored in the HDD 608. Also, in the HDD 608, the programs or data are managed by using a certain file system and/or a DB.

The external interface 603 is an interface to an external device. A recording medium 603*a* exemplifies the external device. Thus, the conference server apparatus 12 can read/write the data stored in the recording medium 603*a* through the external interface 603. A flexible disk, a CD, a DVD, a SD memory card, a USB memory stick, and the like exemplify the recording medium 603*a*.

The ROM 605 is a nonvolatile semiconductor storage device capable of holding data even when a power is turned off. In the ROM 605, programs and data such as BIOS, OS setting, or network setting are stored, which are executed in starting the conference server apparatus 12. The RAM 604 is a volatile semiconductor storage device for temporarily holding programs or data.

The CPU 606 is a processor which retrieves the programs and the data stored in storage devices such as the ROM 605 or the HDD 608 to load them in the RAM 604 and execute them, thereby achieving control or functions of the entire conference server apparatus 12.

The conference server apparatus 12 can perform the processes described later, for example, by executing the programs in the above described hardware configuration.

<Software Configuration>

For example, the conference client apparatus 10 and the conference server apparatus 12 in the electronic conference system 1 of the present embodiment are respectively configured with function blocks described as follows. Additionally, in the following, only function blocks necessary for the description are shown, while function blocks unnecessary for the description may be omitted.

<Conference Client Apparatuses>

Figure 3:
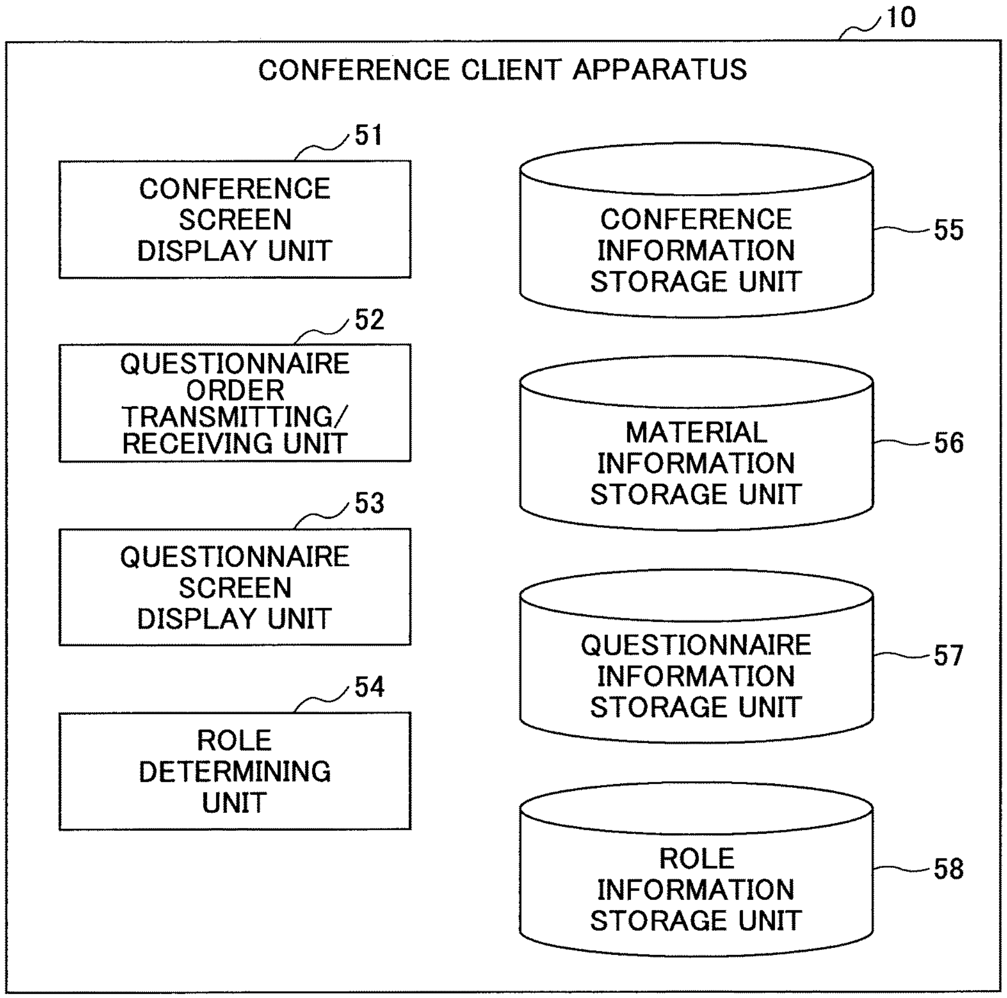
FIG. 3 is a block diagram for illustrating an example functional configuration of a conference client apparatus.

For example, the conference client apparatus 10 is configured with the function blocks shown in FIG. 3. FIG. 3 is a block diagram for illustrating an example functional configuration of the conference client apparatus 10. In the conference client apparatus 10 shown in FIG. 3, a conference screen display unit 51, a questionnaire order transmitting/receiving unit 52, a questionnaire screen display unit 53 and a role determining unit 54 are achieved by executing programs. Also, in the conference client apparatus 10, a conference information storage unit 55, a material information storage unit 56, a questionnaire information storage unit 57 and a role information storage unit 58 are achieved by executing programs. For example, the programs executed in the conference client apparatus 10 are applications installed in the conference client apparatus 10.

The conference screen display unit 51 displays conference information, conference material, etc., received from the conference server apparatus 12. The conference screen display unit 51 accepts operations of the operator such as the presenter or the participant, thereby displaying the conference screens in accordance with the operations.

The questionnaire order transmitting/receiving unit 52 creates a questionnaire start order to send it to the conference server apparatus 12 in a case where a questionnaire start is instructed by an operator having questionnaire start authority. The questionnaire start order sent to the conference server apparatus 12 is distributed to other conference client apparatuses 10 participating in the same electronic conference as that of the conference client apparatus 10 which has sent the questionnaire start order participates in. The questionnaire order transmitting/receiving unit 52 receives the questionnaire start order distributed by the conference server apparatus 12.

The questionnaire screen display unit 53 of the conference client apparatus 10 which receives the questionnaire start order, as described later, displays questionnaire screens in accordance with roles of the operators (such as a presenter or a participant). The role determining unit 54 determines the roles of the operators.

The conference information storage unit 55 stores the conference information received from the conference server apparatus 12. The material information storage unit 56 stores the material information received from the conference server apparatus 12. The questionnaire information storage unit 57 stores the questionnaire information received form the conference server apparatus 12. Also, the role information storage unit 58 stores the role information received from the conference server apparatus 12. Additionally, a detailed description of the conference information, the material information, the questionnaire information and the role information will be given later.

<Conference Server Apparatus>

Figure 4:
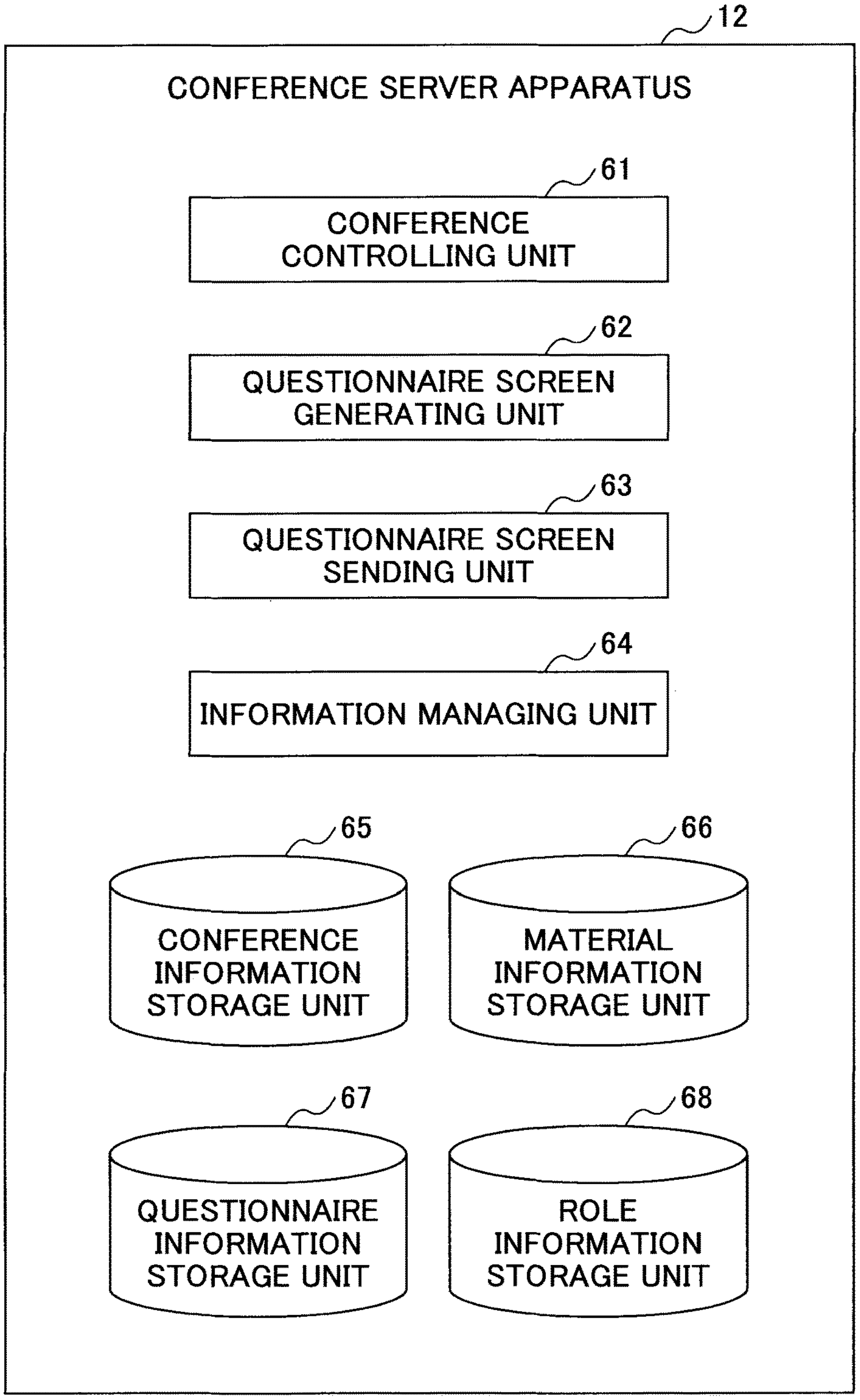
FIG. 4 is a block diagram for illustrating an example functional configuration of a conference server apparatus.

For example, the conference server apparatus 12 is configured with the function blocks shown in FIG. 4. FIG. 4 is a block diagram for illustrating an example functional configuration of the conference server apparatus 12. In the conference server apparatus 12, a conference controlling unit 61, a questionnaire screen generating unit 62, a questionnaire screen sending unit 63, an information managing unit 64, a conference information storage unit 65, a material information storage unit 66, a questionnaire information storage unit 67 and a role information storage unit 68 are achieved by executing programs.

The conference controlling unit 61 provides the function for convening the electronic conference, for controlling participation in the electronic conference, and the function for distributing in real time operations input by a presenter of the electronic conference to the conference client apparatuses 10 participating in the electronic conference. The questionnaire screen generating unit 62 generates questionnaire screens in accordance with the role of the operator of the conference client apparatus 10. The questionnaire screen sending unit 63 sends the questionnaire screens to the conference client apparatuses 10 in accordance with the roles of the operators of the conference client apparatuses 10. The information managing unit 64 manages the conference information, the material information, the questionnaire information, the role information, and the like.

Also, the information storage unit 65 stores the conference information. The material information storage unit 66 stores the material information. The questionnaire information storage unit 67 stores the questionnaire information. Also, the role information storage unit 68 stores the role information. Additionally, a detailed description of the conference information, the material information, the questionnaire information and the role information will be given below.

<Data Structure>

FIG. 5 is a diagram for illustrating an example structure of the conference information. The conference information shown in FIG. 5 includes "Conference Identifier", "Conference Name", "Scheduled Date/Hour", "Administrator Identifier", And "Conference Password" as the items. The "Conference Identifier" is an identifier for identifying the electronic conference. For example, conference ID is an example of the "Conference Identifier". The "Conference Name" indicates a name (title) of the conference. The "Scheduled Date/Hour" indicates the date and hour when the electronic conference will be convened. The administrator identifier is an identifier used for determining whether the operator of the conference client apparatus 10 is an administrator (described later) or not. For example, the operator ID is an example of the "Administrator Identifier". The "Conference Password" is an example of authentication information required for convening or participating in the electronic conference.

FIG. 6 is a diagram for illustrating an example structure of the material information. The material information shown in FIG. 6 includes "Material Identifier", "Conference Identifier", "Material Name", "Type" and "URI" as items. The "Material Identifier" is an identifier for identifying the conference material. For example, material ID is an example of the "Material Identifier". The "Conference Identifier" is an identifier for identifying the electronic conference. The "Material Name" indicates a name (title) of the conference material. The "Type" indicates data format of the conference material. The "URI" indicates a location where the data of the conference material is stored (storage place of the conference material).

FIG. 7 is a diagram for illustrating an example structure of the questionnaire information. The questionnaire information shown in FIG. 7 includes "Questionnaire Identifier", "Material Identifier", "Questionnaire Name", "Answer Screen URI" and "Summary Screen URI" as items.

The "Questionnaire Identifier" is an identifier for identifying the questionnaire. For example, the questionnaire ID is an example of the "Questionnaire Identifier". The "Material Identifier" is an identifier for identifying the conference material. The "Questionnaire Name" indicates a name (title) of the questionnaire. The "Answer Screen URI" and the "Summary Screen URI" respectively indicate a destination to access for displaying the questionnaire screen in accordance with the role of the operator of the conference client apparatus 10. For example, in a case where the role of the operator is the participant, the "Answer Screen URI" indicates the destination to access for displaying answer screen to the questionnaire. In a case where the role of the operator is the presenter, the "Summary Screen URI" indicates the destination to access for displaying summary screen of the questionnaire.

FIG. 8 is a diagram for illustrating an example structure of the role information. The role information shown in FIG. 8 includes "Role Name", "Role Identifier", "Page Synchronization", "Handwritten Memo Synchronization", "Start/End Questionnaire" and "Destination" as items.

The "Role Name" indicates a name of the role. The presenter, the participant and the administrator are included in the "Role Name" of the role information shown in FIG. 8. The "Role Identifier" is an identifier for identifying the role. For example, role ID is an example of the "Role Identifier".

The "Page Synchronization", the "Handwritten Memo Synchronization", and the "Start/End Questionnaire" respectively indicate operations which can be performed by the operator (operator's authority). For example, the operator whose role is the presenter can perform the operation of the "Page Synchronization", the "Handwritten Memo Synchronization", and the "Start/End Questionnaire". While the operator whose role is the participant cannot perform the operation of the "Page Synchronization", the "Handwritten Memo Synchronization", and the "Start/End Questionnaire". The operator whose role is the administrator can perform the operation of the "Start/End Questionnaire".

The "Destination" indicates whether the questionnaire screen in accordance with the role of the operator is the answer screen to the questionnaire or the summary screen of the questionnaire. In a case where the role of the operator is the presenter or the administrator, the questionnaire screen in accordance with the role of the operator is the summary screen of the questionnaire, in the role information shown in FIG. 8. Meanwhile, in a case where the role of the operator is the participant, the questionnaire screen in accordance with the role of the operator is the answer screen to the questionnaire, in the role information shown in FIG. 8. As described above, the role of the operator and the destination to access for displaying the questionnaire screen are associated with each other in the role information.

As shown in FIG. 5 and FIG. 6, the conference information and the material information are associated with each other by the "Conference Identifier". Therefore, the conference material used in the electronic conference can be found based on the conference information and the material information.

Also, as shown in FIG. 6 and FIG. 7, the material information and the questionnaire information are associated with each other by the "Material Identifier". Therefore, the questionnaire information used when the conference material is displayed can be found based on the material information and the questionnaire information.

Further, as shown in FIG. 7 and FIG. 8, the questionnaire information and the role information are associated with each other by the "Role Identifier". Therefore, the destination to access for displaying the questionnaire screen in accordance with the role of the operator of the conference client apparatus 10 can be found based on the questionnaire information and the role information.

Although, in the questionnaire information shown in FIG. 7, two destinations ("Answer Screen URI" and "Summary Screen URI") for displaying the questionnaire screen in accordance with the role of the operator are included, three or more destinations may be included. Also, although, in the role information shown in FIG. 8, three roles of the operator are included, two, or four or more roles may be included.

For, example, a moderator of the electronic conference, the presenter and the participant are exemplified as another example of the roles to be included in the role information. The moderator of the electronic conference, for example, is allowed to perform operations for determining the presenter and the conference material. The presenter, for example, is allowed to perform operations of page feeding (page synchronization), handwritten memo (hand written memo synchronization), scaling (scaling synchronization), and the like. The participant is allowed to display the conference material.

In the following, the present embodiment is described in a case where there are three roles of the presenter, participant and administrator. Additionally, the roles of the presenter and the participant may be switched with each other during the electronic conference. Also, in the electronic conference system 1, in a case where a plurality of the conference client apparatuses 10 participate in the same electronic conference, one of the conference client apparatuses 10 has the role of the presenter and one or more conference client apparatuses 10 have the role of the participant. For example, in a case where the roles of the presenter and the participant are switched with each other during the electronic conference, the conference client apparatus 10 whose role has been the presenter switches to have the role of the participant, while another conference client apparatus 10 whose role has been the participant switches to have the role of the presenter. For example, a participant may be switched to the presenter by selecting a presenter button in a screen (described below) shown in FIG. 14, or by designating one of the participant or the conference client apparatus thereof to be the next presenter, by the former presenter.

<Detail of Process>

In the following, details of the process performed by the electronic conference system 1 of the present embodiment will be described.

<Process of Participation in Conference>

Figure 9:
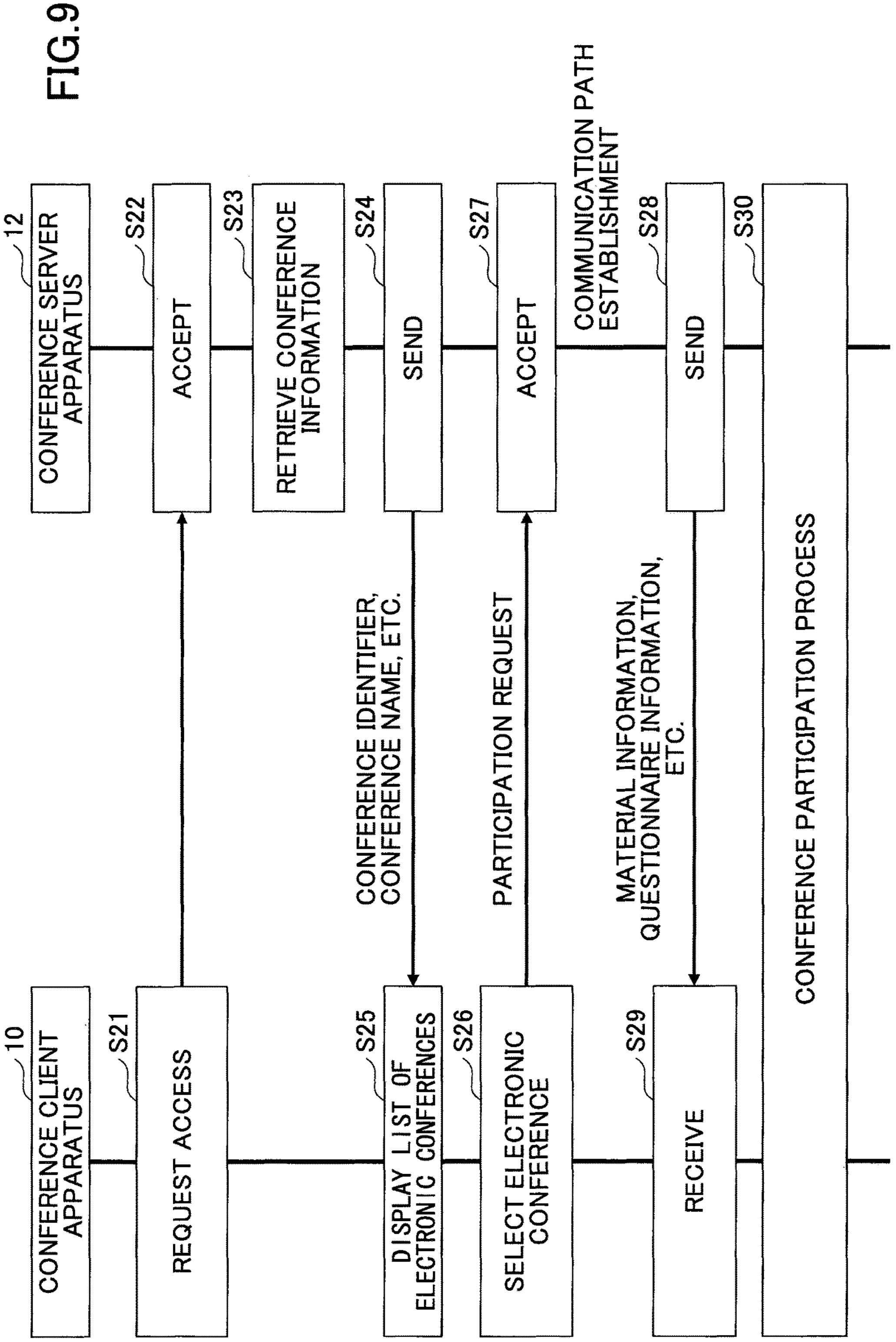
FIG. 9 is a flowchart for illustrating a process of participation in an electronic conference.

FIG. 9 is a flowchart for illustrating a process of participation in the electronic conference. The presenter or the participants of the electronic conference operate the conference client apparatus 10 to request access to a conference participation screen (not shown) of the conference server apparatus 12. For example, the conference screen display unit 51 of the conference client apparatus 10 requests the conference information by accessing an URI of the conference participation screen of the conference server apparatus 12.

In step S22, the conference controlling unit 61 of the conference server apparatus 12 accepts the request for the conference information from the conference client apparatus 10. In step S23, based on the request for the conference information from the conference client apparatus 10, the information managing unit 64 retrieves, from the conference information storage unit 65, the conference information of an electronic conference which can be convened or participated in. In step S24, the conference controlling unit 61 sends the conference information of the electronic conference which can currently be convened or participated in to the conference client apparatus 10.

In step S25, the conference screen display unit 51 of the conference client apparatus 10 displays, based on the received conference information, the conference participation screen by using the display device 502, or the like. A list of the electronic conferences created based on the conference information, which can be convened or participated in, is included in the conference participation screen.

In step S26, the presenter or the participants select an electronic conference to convene or participate in from the list of the electronic conferences in the conference participation screen. The conference screen display unit 51 of the conference client apparatus 10 requests the conference server apparatus 12 for permission to participate in the selected electronic conference (participation request).

In step S27, the conference controlling unit 61 of the conference server apparatus 12 establishes a communication path (session) with the conference client apparatus 10 in response to the participation request from the conference client apparatus 10. The conference server apparatus 12 and the conference client apparatus 10 participating in the electronic conference send/receive information necessary for sharing the conference screen by using the established communication path (session).

As described above, the conference server apparatus 12 and the conference client apparatus 10 participating in the electronic conference share the conference screen by using the established communication path to distribute in real time, through the conference server apparatus 12, messages indicating the operation input to the conference client apparatus 10 of the presenter. A protocol referred to as "XMPP" is exemplified as a protocol for such a real time message distribution using the communication path (session). The page feeding, and an instruction to start or end the questionnaire are exemplified as the operation input to the conference client apparatus 10 of the presenter. Additionally, HTTPS (Hypertext Transfer Protocol Secure) exemplifies a protocol for establishing the communication path for displaying the questionnaire screen (described below). The questionnaire screen is described in HTML (HyperText Markup Language).

XMPP has been standardized as RFC3920 (Extensible Messaging and Presence Protocol: Core), and RFC3921 (Extensible Messaging and Presence Protocol: Instant Messaging and Presence) in IETF, and an extended specification thereof has been documented as XEP.

A service referred to as Multi-User Chat (XEP-0045) is defined in XMPP. In Multi-User Chat, when the conference client apparatus 10 participating in a room provided by XMPP sends a message to the conference server apparatus 12, the message is distributed from the conference server apparatus 12 to all of the conference client apparatuses 10 participating in the room. For example, other than XMPP, protocols such as BOSH which is an extended XMPP, WebSocket or Commet may be used for establishing such a communication path.

BOSH (Bidirectional-streams Over Synchronous HTTP (XEP-0206)) is a technology for sending/receiving message of HTTP in XMPP. Such a protocol enables the conference server apparatus 12 to perform "Push" function. With the "Push" function, the conference server apparatus 12 can asynchronously send information to the conference client apparatus 10 without receiving the request from the conference client apparatus 10, thereby receiving the information by the conference client apparatus 10. Additionally, similar functions may be achieved by using a common HTTP where the conference client apparatus 10 needs to periodically retrieve the information.

In step S28, the conference controlling unit 61 of the conference server apparatus 12 sends, in response to the participation request, the aforesaid material information, the questionnaire information and the role information to the conference client apparatus 10. In step S28, in a case where the electronic conference has been started, information indicating the conference material currently displayed, current page, information related to the presenter and the like may be included.

In step S29, the conference screen display unit 51 of the conference client apparatus 10 receives the aforesaid material information, questionnaire information and the role information. In step S30, the conference screen display unit 51 performs a conference participation process. In the conference participation process, the data of the conference material stored in a storage place indicated by the URI of the material information is retrieved to display in the conference screen.

Additionally, in step S28, for example, the questionnaire information having a structure shown in FIG. 10 is sent from the conference server apparatus 12 to the conference client apparatus 10. FIG. 10 is a diagram for illustrating an example structure of the questionnaire information received by the conference client apparatus 10. The questionnaire information includes information necessary for displaying the questionnaire screen.

For example, in FIG. 10, the questionnaire information includes a component 1000 in which a "Number of Questionnaires" and one or more "Questionnaire Detail Information" are included as the information necessary for displaying the questionnaire screens associated with two conference materials. The "Questionnaire Detail Information" includes the "Questionnaire Identifier", "Title", "Questionnaire Answer URI", and "Questionnaire Summary URI".

Additionally, the "Questionnaire Identifier", the "Title", the "Questionnaire Answer URI", and the "Questionnaire Summary URI" included in the "Questionnaire Detail Information" respectively correspond to the "Questionnaire Identifier", "Questionnaire Name", "Answer Screen URI" and "Summary Screen URI" included in the questionnaire information shown in FIG. 7. Thus, the component 1000 of the questionnaire information shown in FIG. 10 is generated based on the questionnaire information shown in FIG. 7.

Also, in FIG. 10, a component 1002 for associating "Role" of the conference client apparatus 10 with the "Questionnaire Answer URI", and the "Questionnaire Summary URI" is included. Additionally, the "Role" of the conference client 10, the "Questionnaire Answer URI" and the "Questionnaire Summary URI" are respectively correspond to "Role Name" and "Destination (where answer screen URI or summary screen URI is described)" included in the role information shown in FIG. 8. Thus, the component 1002 included in the questionnaire information shown in FIG. 10 is generated based on the role information shown in FIG. 8.

<Role Determination in Conference Client Apparatuses>

Figures 11, 12:
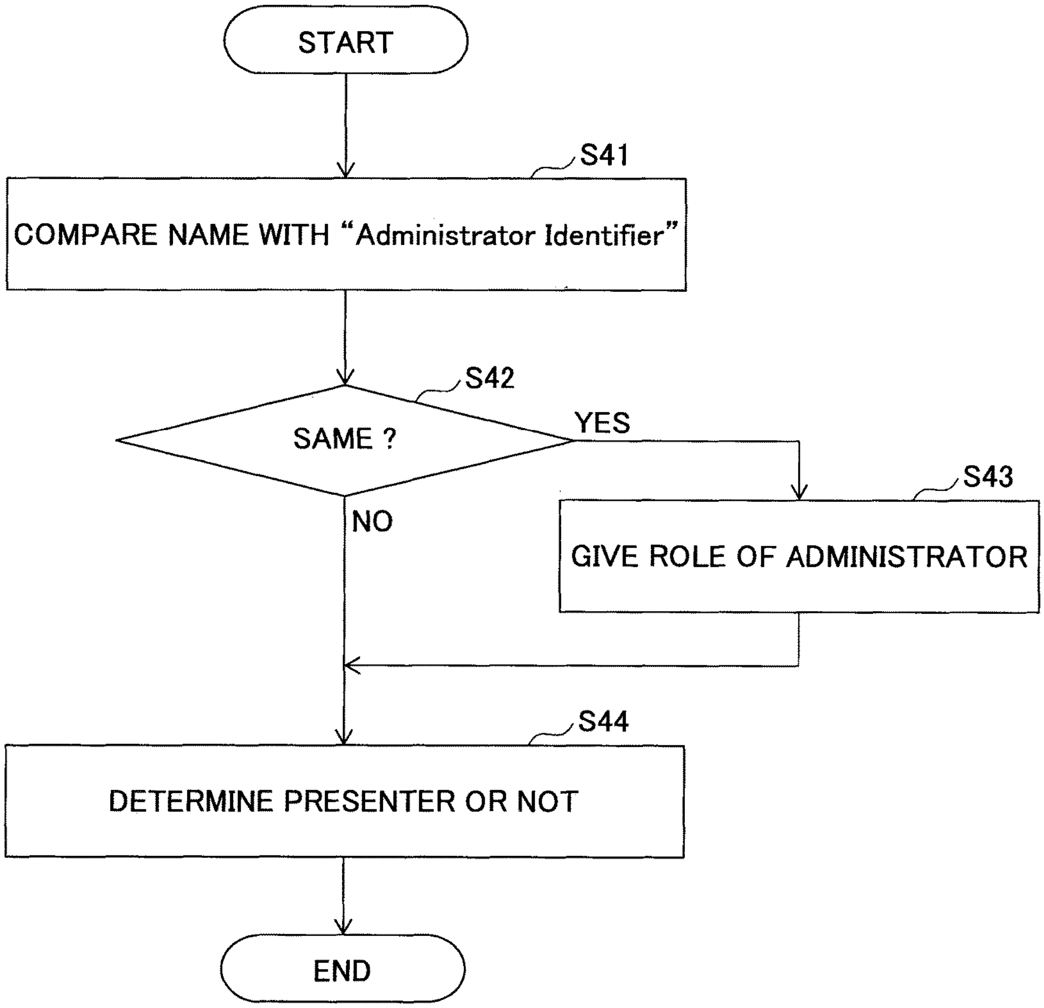
FIG. 11 is a flowchart for illustrating an example of a role determination process.
FIG. 12 is an example of a role table.

The respective role determining units 54 in the conference client apparatuses 10 perform a role determination process shown in FIG. 11 to determine the respective roles of the conference client apparatuses 10. Additionally, the role determination process is performed when the conference client apparatus 10 participates in the electronic conference, when the name of the conference client apparatus 10 is changed, or when the conference client apparatus 10 receives an instruction to change the role during the electronic conference.

FIG. 11 is a flowchart for illustrating an example of the role determination process. In step S41, the role determining unit 54 included in the conference client apparatuses 10 compares the "Administrator Identifier" included in the conference information shown in FIG. 5 with the name of the conference client apparatuses 10.

When the "Administrator Identifier" included in the conference information shown in FIG. 5 is found to be the same as the name of the conference client apparatuses 10 in step S42, the role determining unit 54 gives the conference client apparatus 10 the role of the administrator in step S43, and proceeds to step S44. When the "Administrator Identifier" included in the conference information is found to be different from the name of the conference client apparatuses 10, the process of step S43 is skipped and the process proceeds to step S44. In step S44, the role determining unit 54 determines whether the role is the presenter or not, thereby giving the conference client apparatus 10 the role of the presenter or the participant.

Additionally, for example, the role determining unit 54 manages the determined role of the conference client apparatus 10 by using a role table shown in FIG. 12. FIG. 12 is an example of the role table. Information indicating whether the conference client apparatus 10 is the administrator or not, and information indicating whether the conference client apparatus 10 is the presenter or the participant is included in the role table shown in FIG. 12.

As shown in the role table in FIG. 12, the respective conference client apparatus 10 manages the role of itself based on the information indicating whether the conference client apparatus 10 is the administrator or not and the information indicating whether the conference client apparatus 10 is the presenter or the participant. Additionally, during the electronic conference, the conference client apparatus 10 can be given the role of the presenter by sending XMPP message for changing the role to the conference server apparatus 12. The conference server apparatus 12 distributes the XMPP message for changing the role sent from the conference client apparatus 10 to the conference client apparatuses 10 participating in the electronic conference to let them update their respective role tables.

In flowchart shown in FIG. 11, although an example where the "Administrator Identifier" is compared with the name of the conference client apparatus 10 is described, MAC address, IP address, branch number, user name, etc., may be used instead of the name of the conference client apparatus 10. However, when using the name of the conference client apparatus 10 or the user name which can be changed easily, the conference client apparatus 10 can freely switch a state of being the administrator and a state of not being an administrator. Additionally, the regular expression may be used for the "Administrator Identifier".

Also, although, in the present embodiment, the "Administrator Identifier" is included in the conference information, it may be included in other information associated with the electronic conference such as the questionnaire information. For example, in which information the "Administrator Identifier" is to be included is determined according to a range of operations which are performed by the administrator instead of the presenter.

<Questionnaire Start Process>

Figure 13:
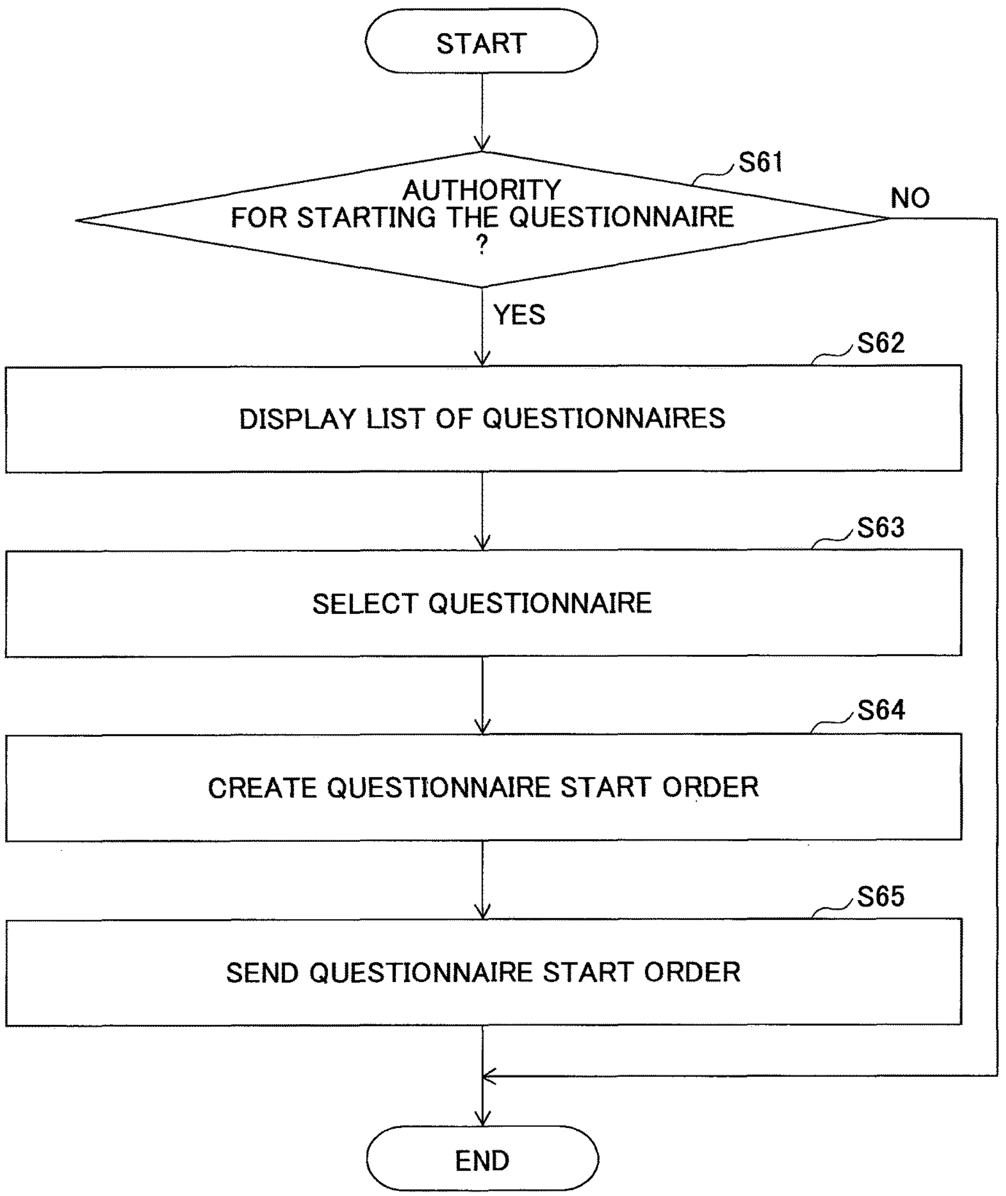
FIG. 13 is a flowchart for illustrating an example of a questionnaire start process.

FIG. 13 is a flowchart for illustrating an example of a questionnaire start process. The questionnaire start process shown in FIG. 13 is started when the operator pushes a questionnaire start button in the conference screen displayed by the conference client apparatus 10.

In step S61, the questionnaire order transmitting/receiving unit 52, referring to the role table shown in FIG. 12, determines whether the operator of the conference client apparatus 10 has the authority for starting the questionnaire or not. The questionnaire order transmitting/receiving unit 52 determines that the operator of the conference client apparatus 10 has the authority for starting the questionnaire in a case where the role of the conference client apparatus 10 is the presenter or the administrator.

Figure 14:
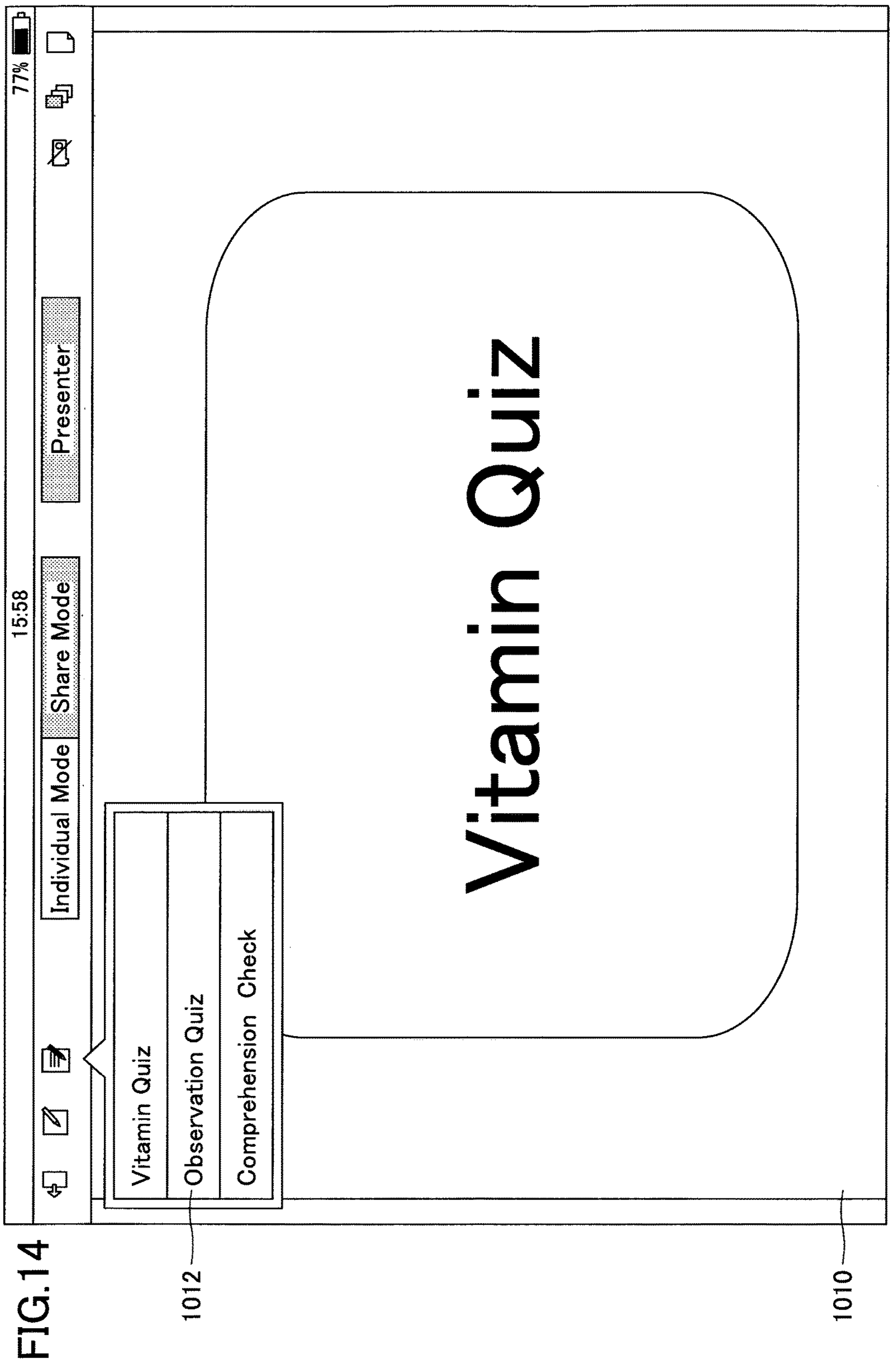
FIG. 14 is an illustration diagram for showing an example of a conference screen of a presenter, where a list of questionnaires is shown.

In a case where the operator of the conference client apparatus 10 has the authority for starting the questionnaire, questionnaire order transmitting/receiving unit 52 displays, in step S62, a list of questionnaires associated with the conference material with reference to the questionnaire information shown in FIG. 7. FIG. 14 is an illustration diagram for showing an example of the conference screen of the presenter, where the list of questionnaires is shown. Also, an example of the conference screen 1010 of the presenter where a questionnaire list 1012 including three names of the questionnaires is shown in FIG. 14.

Figure 15:
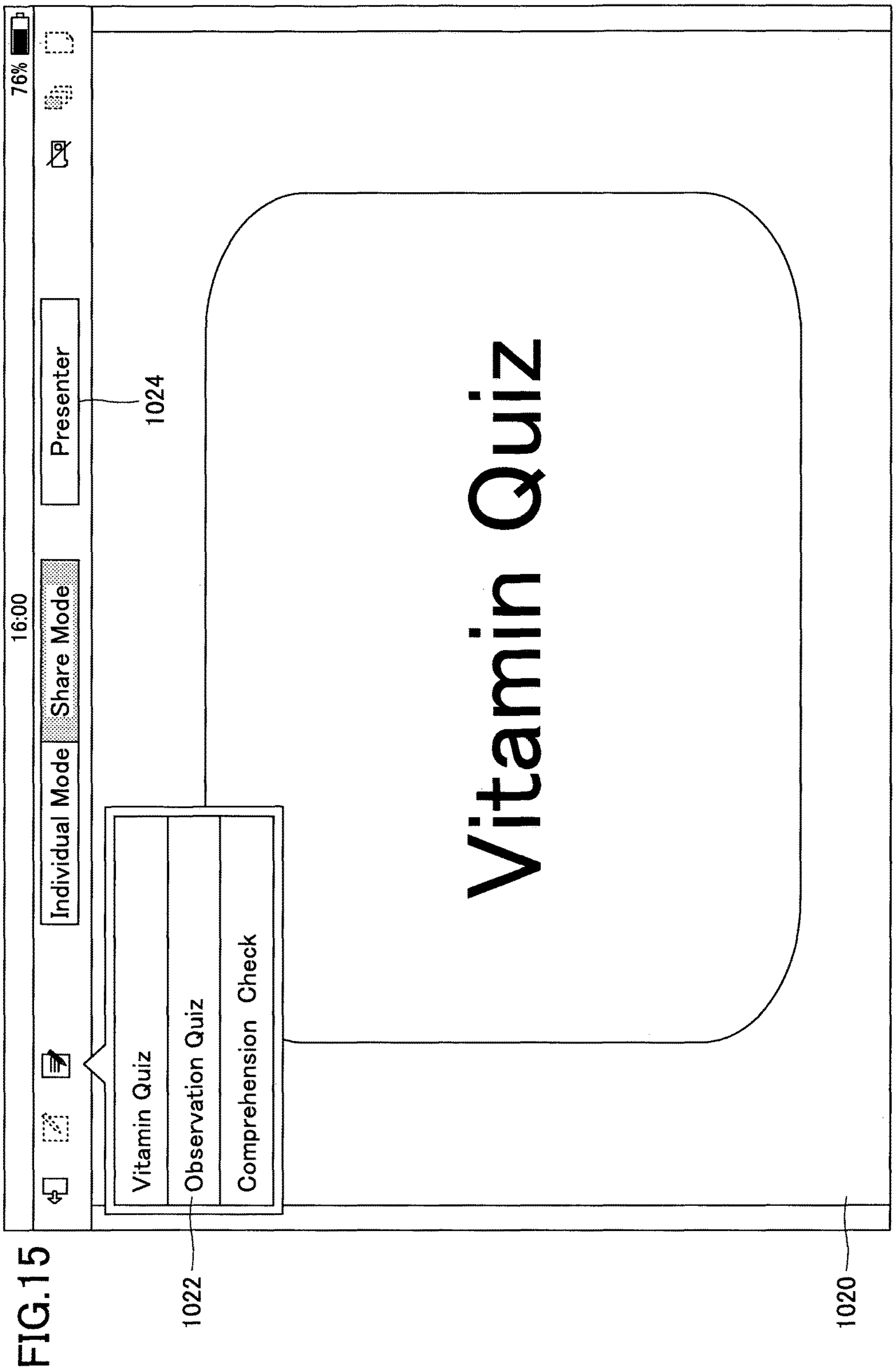
FIG. 15 is an illustration diagram for showing an example of the conference screen of an administrator where the list of questionnaires is shown.

Additionally, as shown in FIG. 15, in a case where the operator of the conference client apparatus 10 is the administrator, the questionnaire order transmitting/receiving unit 52 displays the conference screen 1020 of the administrator where a questionnaire list 1022 is shown. FIG. 15 is an illustration diagram for showing an example of the conference screen of the administrator where the list of questionnaires is shown. In the conference screen 1020 shown in FIG. 15, the presenter button 1024 is not selected, which is different from the conference screen 1010 shown in FIG. 14.

Figure 16:
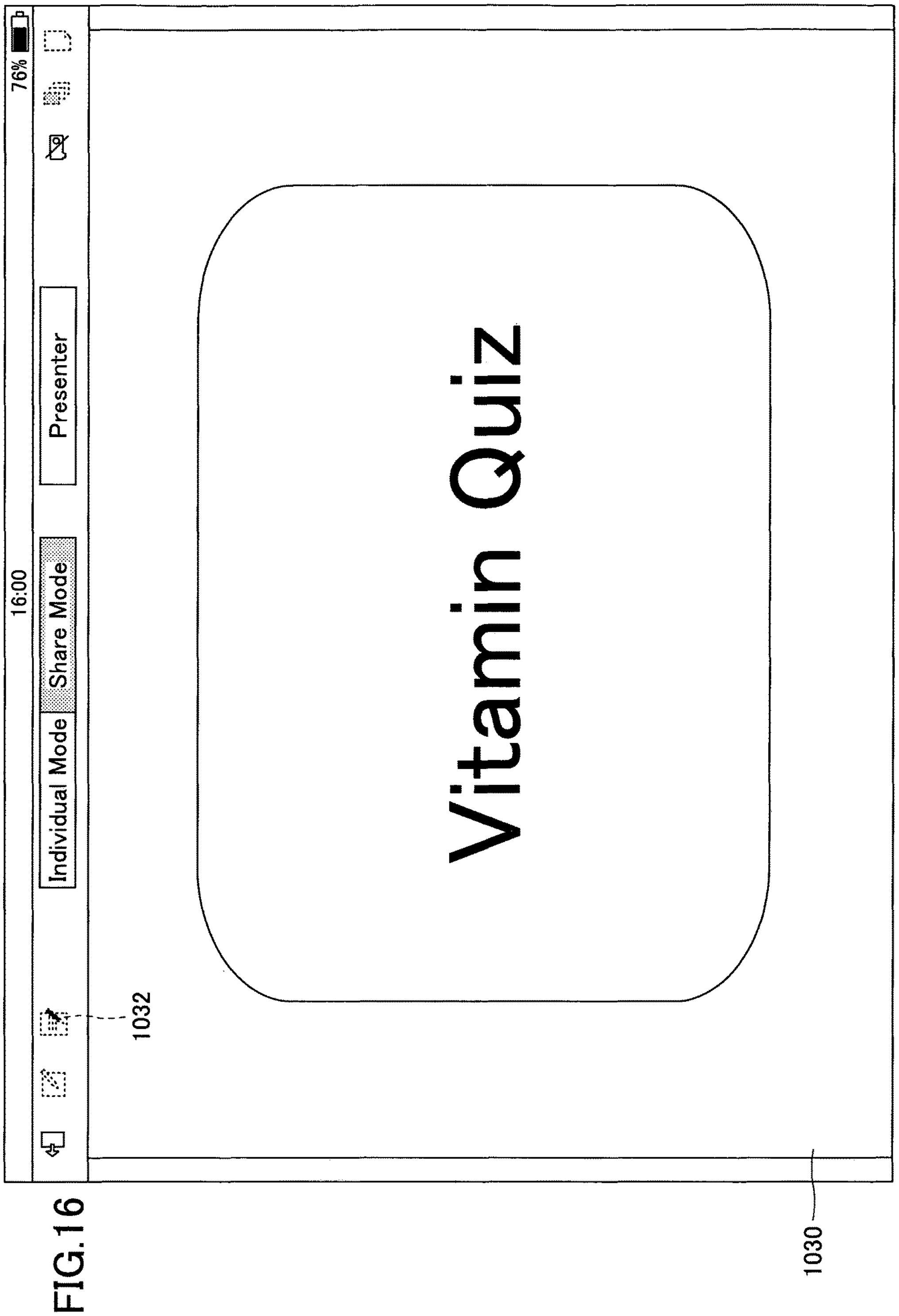
FIG. 16 is an illustration diagram for showing another example of the conference screen.

When it is determined, in step S61, that the operator does not have the authority for starting the questionnaire, the questionnaire order transmitting/receiving unit 52 finishes the process shown in FIG. 13 without sending the questionnaire start order. As described above, the operator who does not have the authority for starting the questionnaire cannot start the questionnaire. Additionally, as shown in FIG. 16, the conference client apparatus 10 not having the authority for starting the questionnaire may display the conference screen 1030 where the questionnaire start button 1032 cannot be pushed. FIG. 16 is an illustration diagram for showing another example of the conference screen.

In step S63, the operator who has the authority for starting the questionnaire selects a questionnaire to be started from the questionnaire list 1012 shown in FIG. 14, or the like. In step S64, the questionnaire order transmitting/receiving unit 52 creates the questionnaire start order shown in FIG. 17 based on the "Questionnaire Identifier" of the questionnaire selected from the questionnaire list 1012, or the like.

FIG. 17 is an illustration diagram for showing an example of the questionnaire start order. The questionnaire start order shown in FIG. 17 includes the "Questionnaire Identifier" of "123". In step S65, the questionnaire order transmitting/receiving unit 52 sends the created questionnaire start order to the conference server apparatus 12, thereby finishing the process shown in FIG. 13.

The conference server apparatus 12, receiving the questionnaire start order shown in FIG. 17, distributes the questionnaire start order to the conference client apparatuses 10 participating in the electronic conference. Then, the conference client apparatus 10, receiving the questionnaire start order from the conference server apparatus 12, performs a questionnaire display process shown in FIG. 18.

Figure 18:
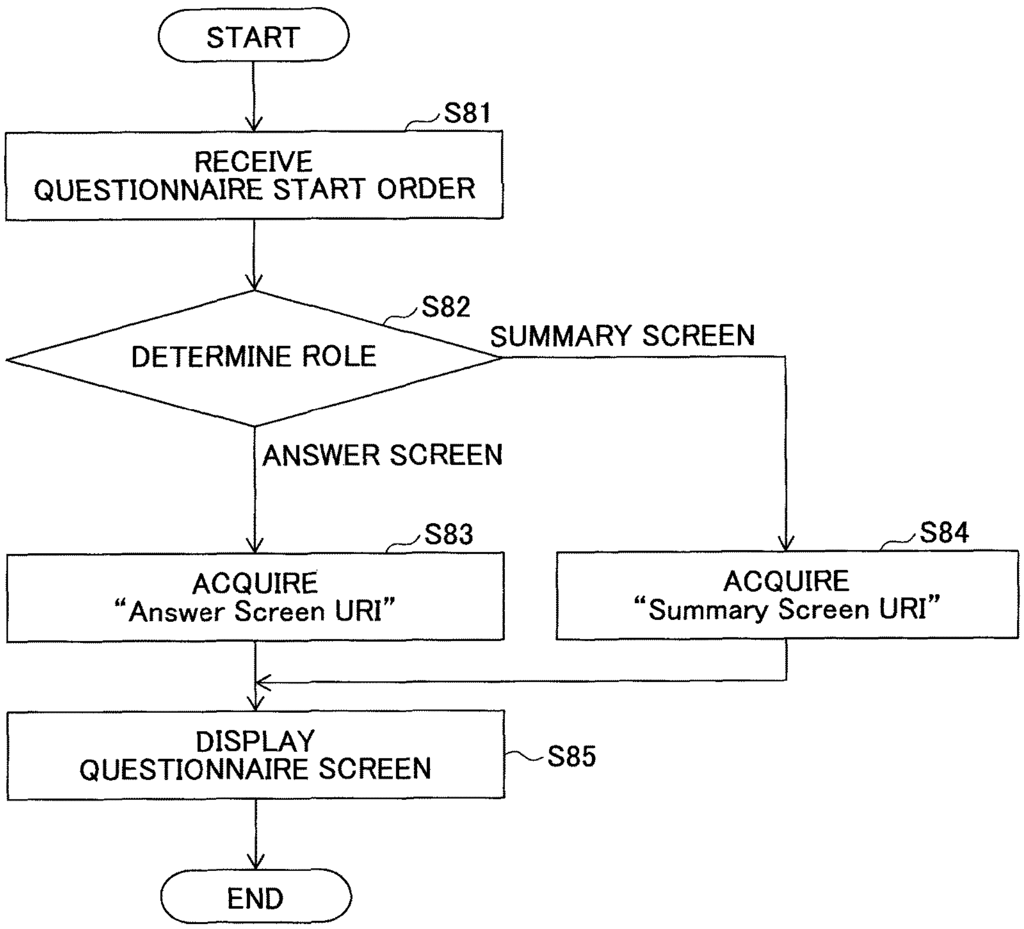
FIG. 18 is a flowchart illustrating an example of a questionnaire display process.

FIG. 18 is a flowchart illustrating an example of the questionnaire display process. In step S81, the conference client apparatus 10 receives the questionnaire start order. In step S82, the role determining unit 54 of the conference client apparatus 10 determines the role of the conference client apparatus 10 with reference to the role table shown in FIG. 12. The questionnaire screen display unit 53 determines whether the role of the operator is the role for viewing the summary screen of the questionnaire or for viewing the answer screen to the questionnaire with reference to the role information shown in FIG. 8.

In a case where the role of the operator is the role for viewing the answer screen to the questionnaire, the questionnaire screen display unit 53 acquires, in step S83, "Answer Screen URI" which is the destination to access for displaying the answer screen to the questionnaire with reference to the questionnaire information shown in FIG. 7. Then, in step S85, the questionnaire screen display unit 53 accesses to the "Answer Screen URI", thereby displaying the answer screen to the questionnaire.

Meanwhile, in a case where the role of the operator is the role for viewing the summary screen of the questionnaire, the questionnaire screen display unit 53 acquires, in step S84, the "Summary Screen URI" which is the destination to access for displaying the summary screen of the questionnaire with reference to the questionnaire information shown in FIG. 7. Then, in step S85, the questionnaire screen display unit 53 accesses to the "Summary Screen URI", thereby displaying the summary screen of the questionnaire.

Figure 19:
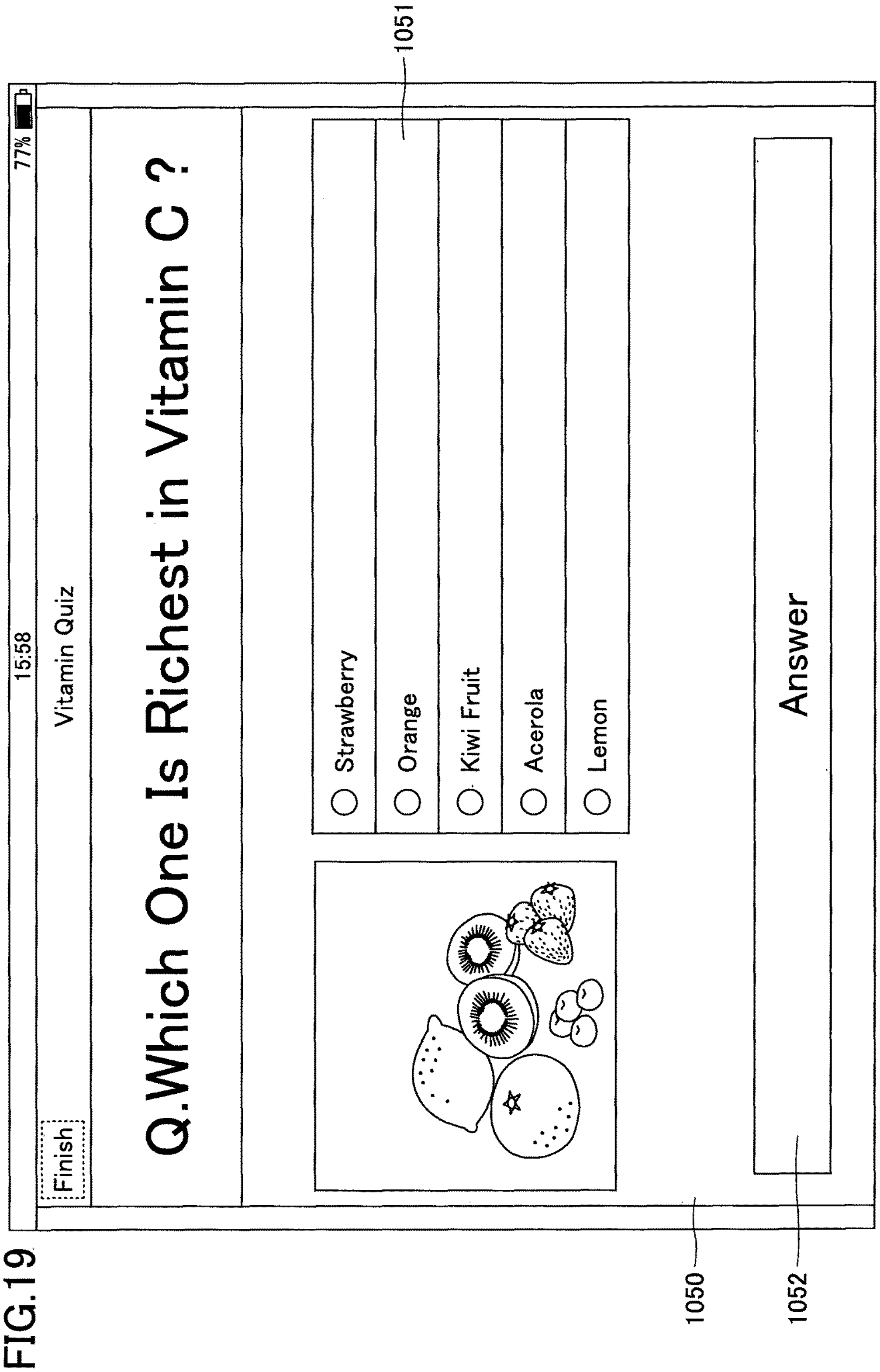
FIG. 19 is an illustration diagram for showing an example of an answer screen to the questionnaire.
Figure 20:
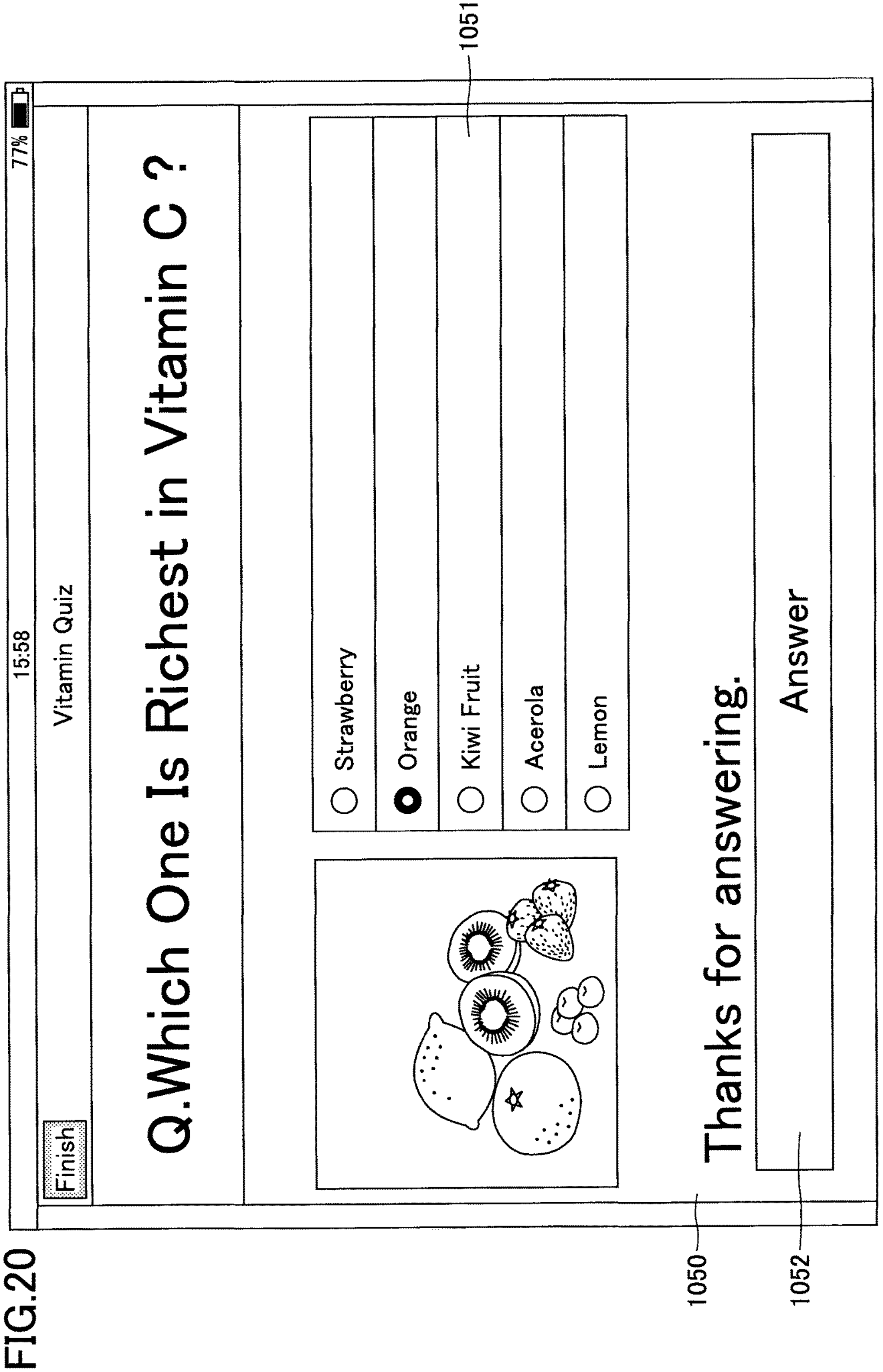
FIG. 20 is an illustration diagram for showing an example of the answer screen to the questionnaire after sending the answer to the questionnaire to the conference server apparatus.

FIG. 19 is an illustration diagram for showing an example of the answer screen to the questionnaire. In FIG. 19, the answer screen to the questionnaire 1050 includes an answer field 1051 and an answer button 1052. The operator whose role is the participant inputs answer to the questionnaire in the answer field 1051 and pushes the answer button 1052, thereby sending the answer to the questionnaire to the conference server apparatus 12. FIG. 20 is an illustration diagram for showing an example of the answer screen to the questionnaire after sending the answer to the questionnaire to the conference server apparatus 12.

Figure 21:
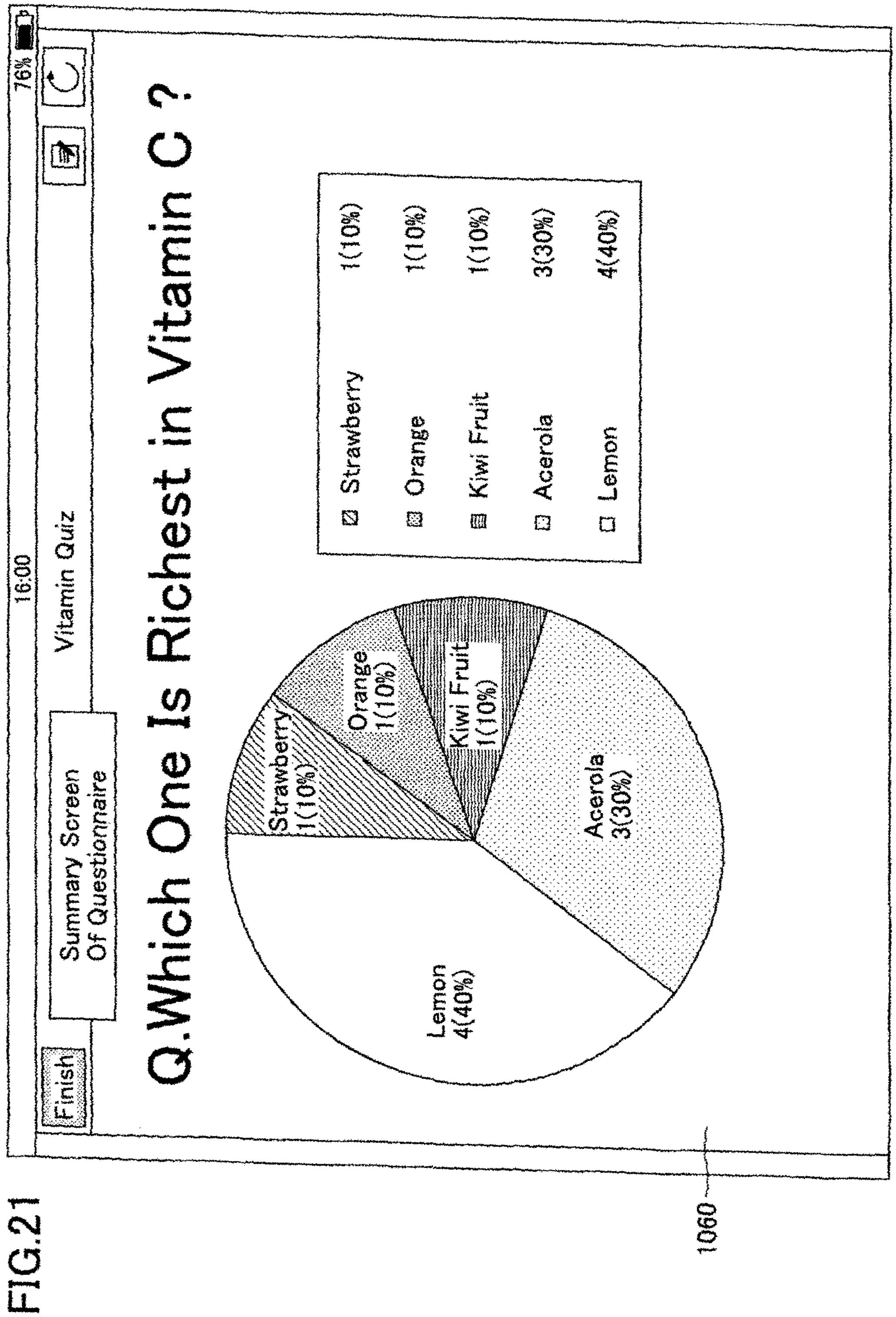
FIG. 21 is an illustration diagram for showing an example of a summary screen of the questionnaire.

FIG. 21 is an illustration diagram for showing an example of the summary screen of the questionnaire. The summary screen of the questionnaire 1060 shown in FIG. 21 shows the summary of the questionnaire based on the answers sent from the conference client apparatuses 10 whose roles are the participants. For example, summary screen of the questionnaire shown in FIG. 21 can be achieved by using scripts operated on a browser for automatically and dynamically displaying the summary of the questionnaire in a graph.

Figure 22:
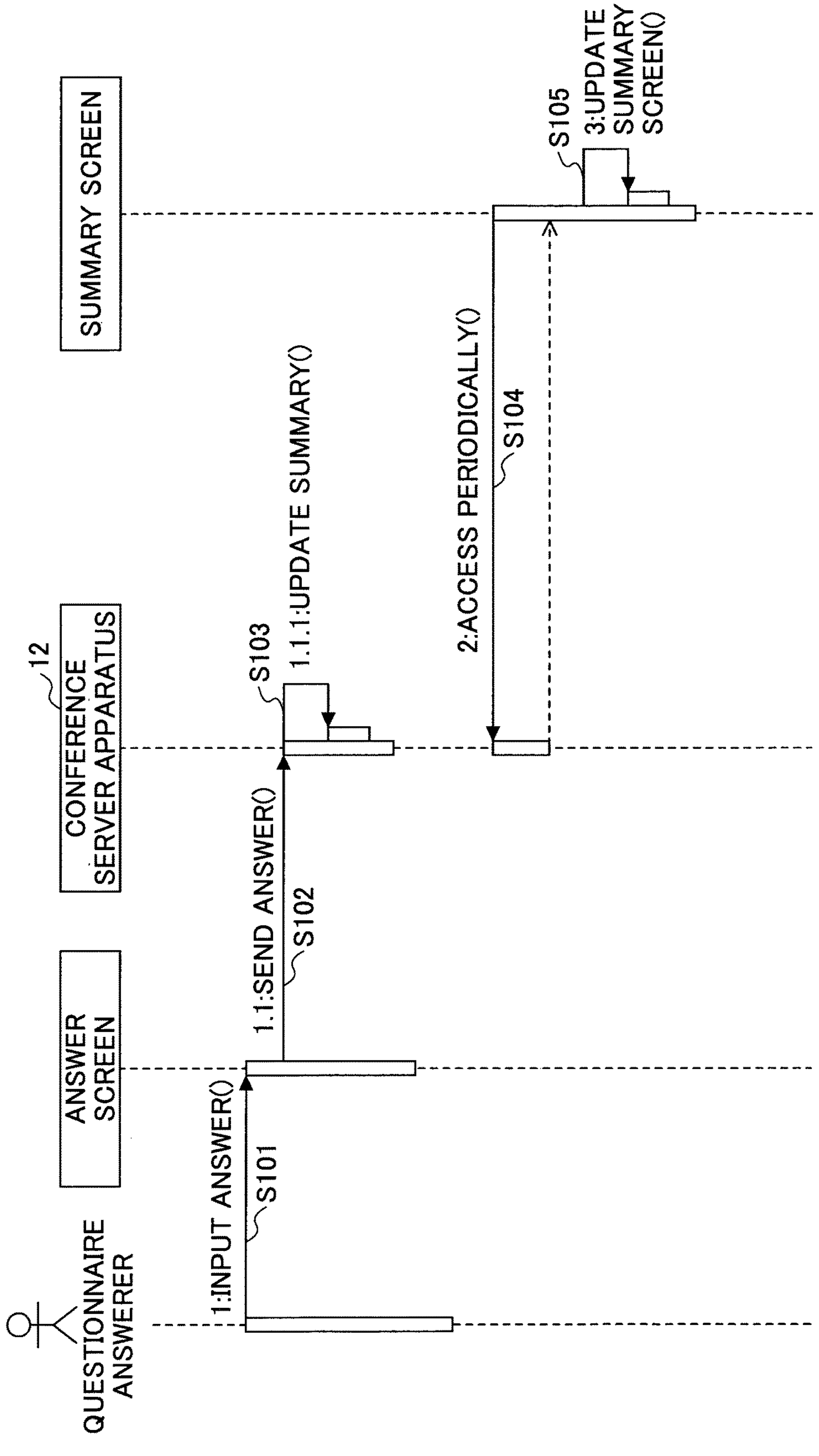
FIG. 22 is a sequence diagram for illustrating a questionnaire summarizing process.

FIG. 22 is a sequence diagram for illustrating a questionnaire summarizing process. In step S101, a questionnaire answerer whose role is the participant inputs the answer to the questionnaire in answer field 1051 of the answer screen to the questionnaire 1050 and pushes the answer button 1052.

In step S102, the questionnaire screen display unit 53 of the conference client apparatus 10 operated by the participant sends the answer to the questionnaire to the conference server apparatus 12. In step S103, information managing unit 64 of the conference server apparatus 12 updates the summary of the questionnaire with the received answer to the questionnaire.

In step S104, the questionnaire screen display unit 53 of the conference client apparatus 10 operated by the presenter or the administrator periodically accesses the "Summary Screen URI", thereby acquiring the summary of the questionnaire. The questionnaire screen display unit 53 updates the summary screen of the questionnaire 1060 when the summary of the questionnaire is changed.

The summary of the questionnaire shown in the summary screen of the questionnaire 1060 of the conference client apparatus 10 can be periodically or in real time updated according to the process shown in FIG. 22.

Additionally, the summary screen of the questionnaire 1060 may be displayed by the conference display apparatus 14 as well as the conference client apparatus 10 whose role is the presenter or the administrator. Although, in the present embodiment, the electronic conference system 1 is described as an example, the present technology may be applied to another system where the displayed content may vary according to the role of the operator of the client apparatus.

Additionally, in a case where the summary screen of the questionnaire 1060 is displayed by the conference client apparatus 10 whose role is the presenter or the administrator and by the conference display apparatus 14, the summary screen of the questionnaire 1060 may be temporally displayed only by the conference client apparatus 10 whose role is the presenter. In this case, the summary screen of the questionnaire 1060 may be displayed by the conference client apparatus 10 of the administrator and the conference display apparatus 14 when the operational input for permitting display is accepted in the conference client apparatus 10 of the presenter.

Specifically, in a case where the role of the conference client apparatus 10 is determined to be the presenter in step S82 shown in FIG. 18, the summary screen of the questionnaire 1060 is directly displayed. Meanwhile, in a case where the role of the conference client apparatus 10 is determined to be the administrator or the role of the conference display apparatus (for example, role for displaying the screen of the conference client apparatus 10 of the presenter), the summary screen of the questionnaire 1060 is displayed being covered by another screen so that the summary result cannot be seen. Then, when the operational input by the presenter for permitting display is accepted, the conference client apparatus 10 of the presenter sends information indicating the operational input for permitting display to the conference client apparatus 10 whose role is the administrator and the conference display apparatus 14.

The conference client apparatus 10 of the administrator and the conference display apparatus 14, receiving the information indicating the operational input for permitting display, can display the complete summary screen of the questionnaire 1060 by eliminating the other screen which has covered the summary screen of the questionnaire 1060. As described above, according to the electronic conference system 1 of the present embodiment, the summary screen of the questionnaire 1060 can be temporally displayed only by the conference client apparatus 10 of the presenter. Therefore, the summary of the questionnaire can be displayed at timing rightly intended by the presenter.

For example, the present technology may be applied to systems such as a bid system in which a role of seller and a role of buyer are defined, a learning system in which a role of teacher and a role of student are defined, or quiz system in which a role of question master and a role of answerer are defined. Also, the present technology may be applied to a presentation system in which a role of internal party and a role of external party are defined, and the materials to be presented are varied according to the roles.

SUMMARY

The questionnaire of the electronic conference system 1 of the present embodiment is not associated with page feeding (page synchronization) and page number of the conference material. Therefore, problems do not occur, such as that sequence of the questionnaire cannot be changed or that the questionnaire cannot be started without feeding the page.

Also, according to the electronic conference system of the present embodiment, a problem does not occur, such as that the questionnaire is started when the page of the conference material to be shown is skipped in the presentation or the page of the conference material to be shown is farther back in the presentation. Further, according to the electronic conference system 1 of the present embodiment, the questionnaire can be omitted in view of progress of the conference (presentation). As described above, according to the electronic conference system 1 of the present embodiment, the questionnaires can be started or ended at any timing and in arbitrary sequence, where the questionnaires are associated with identical conference material.

Further, according to the electronic conference system 1 of the present embodiment, the role of the conference client apparatus 10 is determined after receiving the questionnaire start order to change the questionnaire screen to be displayed according to the role. Therefore, according to the electronic conference system 1 of the present embodiment, the questionnaire screen can be displayed according to the respective roles even when the roles are dynamically changed after starting the electronic conference.

For example, in the electronic conference system 1 of the present embodiment, the role of the conference client apparatus 10, whose name is changed to be the same as the "Administrator Identifier" after starting the electronic conference, becomes the administrator. Also, in the electronic conference system 1 of the present embodiment, the role of the conference client apparatus 10 is changed from the participant to the presenter or from the presenter to the participant by using the XMPP message for changing the roles.

In the electronic conference system 1 of the present embodiment, the conference client apparatus 10 can determine a type of the questionnaire screen (summary screen of the questionnaire or answer screen to the questionnaire) by acquiring the role information before participating in the electronic conference. Also, in the electronic conference system 1 of the present embodiment, the conference client apparatus 10 can determine the destination to access according to the type of the questionnaire screen in every questionnaire associated with the conference material, by acquiring the questionnaire information before participating in the electronic conference.

Therefore, in the electronic conference system 1 of the present embodiment, the summary screen of the questionnaire or the answer screen to the questionnaire can be displayed according to the respective roles even when the roles are dynamically changed after starting the electronic conference.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, the conference server apparatus 12 is an example of an information processing apparatus. The conference client apparatus 10 is an example of a terminal device. The conference screen display unit 51 is an example of an objective content display unit. The role determining unit 54 is an example of a role determining unit. The questionnaire screen display unit 53 is an example of the related content display unit. The questionnaire order transmitting/receiving unit 52 is an example of a display order sending unit.

The conference information storage unit 65, the material information storage unit 66, the questionnaire information storage unit 67, and the role information storage unit 68 are respectively examples of a storage unit for storing an objective content, related content information indicating the related content associated with the objective content, and a storage place of the related content according to roles. The conference controlling unit 61 is an example of a controlling unit. The conference material is an example of the objective content. The questionnaire screen is an example of the related content. The list of the questionnaires is an example of a list of the related content. The questionnaire start order is an example of display order of the related content.

Additionally, the electronic conference system 1 including the conference client apparatus 10, conference server apparatus 12, and the conference display apparatus 14 is not a limiting example, and various system configurations may be applied in accordance with application or a purpose.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-128322 filed on Jun. 23, 2014, and Japanese Priority Application No. 2015-080170 filed on Apr. 9, 2015, the entire contents of which are hereby incorporated herein by reference.

1 electronic conference system
10 conference client apparatuses
12 conference server apparatus
14 conference display apparatus
51 conference screen display unit
52 questionnaire order transmitting/receiving unit
53 questionnaire screen display unit
54 role determining unit
55 conference information storage unit
56 material information storage unit
57 questionnaire information storage unit
58 role information storage unit
61 conference controlling unit
62 questionnaire screen generating unit
63 questionnaire screen sending unit
64 information managing unit
65 conference information storage unit
66 material information storage unit
67 questionnaire information storage unit
68 role information storage unit
501, 601 input device
502, 602 display device
505, 603 external interface
503*a*, 603*a* recording medium
504, 604 RAM (Random Access Memory)
505, 605 ROM (Read Only Memory)
506, 606 CPU (Central Processing Unit)
507, 607 communication interface
508, 608 HDD (Hard Disk Drive)
N1 network

The invention claimed is:

1. A terminal device, comprising:
a display;
a hardware processor; and
a hardware memory that contains instructions that cause the hardware processor to:
send, to a conference server apparatus, a request for conference information;
display, on the display, a list of electronic conferences created from conference information received from the conference server in response to the request for conference information;
send, to the conference server apparatus, a request to participate in an electronic conference selected from the displayed list of electronic conferences;
receive questionnaire information from the conference server apparatus through an established communication session, the received questionnaire information including (i) first role information that associates a first role played by one or more terminal devices to first information that indicates a storage place for questionnaire summary screen data; and (ii) second role information that associates a second role played by one or more terminal devices to second information that indicates a storage place for questionnaire answer screen data;
receive a questionnaire start order from the conference server apparatus through the established communication session;
determine, after receiving the questionnaire start order from the conference server apparatus, that a role of the terminal device itself is the first role or the second role;
acquire, when the hardware processor determines that the role of the terminal device itself is the first role, the questionnaire summary screen data from the storage place for the questionnaire summary screen data, by referring to the first role information that associates the first role to the first information; and display the acquired questionnaire summary screen data on the display;
acquire, when the hardware processor determines that the role of the terminal device itself is the second role, the questionnaire answer screen data from the storage place for the questionnaire answer screen data, by referring to the second role information that associates the second role to the second information; and display the acquired questionnaire answer screen data on the display.

2. The terminal device as claimed in claim 1, wherein the role of the terminal device is changed within a period from start of sharing conference material with a plurality of terminal devices to the end of sharing the conference material, and the hardware processor determines that the role of the terminal device itself is the first role or the second role after the role of the terminal device is changed.

3. The terminal device as claimed in claim 1, wherein the instructions cause the hardware processor to display a list of questionnaires associated with conference material, and accept selection of a questionnaire from the list of the questionnaires by an operator of the terminal device.

4. The terminal device as claimed in claim 3, wherein the instructions cause the hardware processor to determine whether the role of the terminal device has an authority for sending a display order of a questionnaire or not, by referring to authority information, which is stored in the hardware memory, indicating authorities of the respective roles, and displays the list of the questionnaires associated with the conference material in a case where the role of the terminal device has an authority for sending the display order of the questionnaire.

5. The terminal device as claimed in claim 1, wherein answers to the questionnaire are summarized by the conference server apparatus, and the instructions cause the hardware processor to display a summary screen of the questionnaire in which the summary of answers to the questionnaire created by the conference server apparatus is included.

6. The terminal device as claimed in claim 5, wherein the instructions cause the hardware processor to display the summary screen of the questionnaire in which the summary of answers to the questionnaire created by the information processing apparatus is included when receiving information for permitting display from a terminal device operated by the operator whose role is a checker.

7. The terminal device as claimed in claim 1, wherein the instructions cause the hardware processor to store, in the hardware memory of the terminal device, third role information indicating (i) whether the role of the terminal device is the first role, and (ii) whether the role of the terminal device is the second role; and wherein the instructions cause the hardware processor to perform the determining, after the receiving of the questionnaire start order from the conference server apparatus, that the role of the terminal device itself is the first role or the second role, by referencing the third role information.

8. The terminal device as claimed in claim 1, wherein the instructions cause the hardware processor to store, in the hardware memory of the terminal device, third role information indicating (i) whether the role of the terminal device is the first role, and (ii) whether the role of the terminal device is the second role;

wherein the instructions cause the hardware processor to change the third role information stored in the hardware memory of the terminal device, within a period from start of sharing conference material with a plurality of terminal devices to the end of sharing the conference material, in response to an instruction for changing the role of the terminal device that the terminal device receives from the conference server apparatus;

wherein the instructions cause the hardware processor to perform the determining, after the receiving of the questionnaire start order from the conference server apparatus, that the role of the terminal device itself is the first role or the second role, by referencing the changed third role information.

9. The terminal device as claimed in claim 1, wherein the received questionnaire information includes (i) a first component containing the first role information and the second role information, and (ii) a second component containing questionnaire detail information.

10. A method for conducting an electronic conference, comprising the steps of:

sending a request for conference information from a terminal device to a conference server apparatus;

displaying, on a display of the terminal device, a list of electronic conferences created from conference information received by the terminal device from the conference server in response to the request for conference information;

sending, from the terminal device to the conference server apparatus, a request to participate in an electronic conference selected from the displayed list of electronic conferences;

receiving, by the terminal device, questionnaire information from the conference server apparatus through the established communication session, the received questionnaire information including (i) first role information that associates a first role played by one or more terminal devices to first information that indicates a storage place for questionnaire summary screen data; and (ii) second role information that associates a second role played by one or more terminal devices to second information that indicates a storage place for questionnaire answer screen data;

receiving, by the terminal device, a questionnaire start order from the conference server apparatus through the established communication session;

determining, by the terminal device, after receiving the questionnaire start order from the conference server apparatus, that a role of the terminal device itself is the first role or the second role;

acquiring, by the terminal device, upon determining that the role of the terminal device itself is the first role, the questionnaire summary screen data from the storage place for the questionnaire summary screen data, by referring to the first role information that associates the first role to the first information; and displaying the acquired questionnaire summary screen data on the display;

acquiring, by the terminal device, upon determining that the role of the terminal device itself is the second role, the questionnaire answer screen data from the storage place for the questionnaire answer screen data, by referring to the second role information that associates the second role to the second information; and displaying the acquired questionnaire answer screen data on the display.

11. The method as claimed in claim 10, wherein the role of the terminal device is changed within a period from start of sharing conference material with the terminal devices to the end of sharing the conference material, and the method further includes determining that the role of the terminal device itself is the first role or the second role after the role of the terminal device is changed.

12. The method as claimed in claim 10, further comprising: displaying a list of the questionnaires associated with conference material, and accepting selection of a questionnaire from the list of the questionnaires by an operator of the terminal device.

13. The method as claimed in claim 12, further comprising determining whether the role of the terminal device has an authority for sending a display order of a questionnaire or not, by referring to stored authority information indicating authorities of the respective roles, and displaying the list of the questionnaires associated with the conference material in a case where the role of the terminal device has an authority for sending the display order of the questionnaire.

14. The method as claimed in claim 10, further comprising summarizing, by the conference server apparatus, answers to the questionnaire; and displaying by the terminal device, the summary screen of the questionnaire in which the summary of answers to the questionnaire created by the conference server apparatus is included.

15. The method as claimed in claim 14, further comprising displaying by the terminal device, the summary screen of the questionnaire in which the summary of answers to the questionnaire created by the information processing apparatus is included when receiving information for permitting display from the terminal device operated by the operator whose role is a checker.

16. The method as claimed in claim 10, wherein the method further comprises storing, by the terminal device, in a hardware memory of the terminal device, third role information indicating (i) whether the role of the terminal device is the first role, and (ii) whether the role of the terminal device is the second role; and wherein the determining, after the receiving of the questionnaire start order from the conference server apparatus, that the role of the terminal device itself is the first role or the second role, is performed by referencing the third role information.

17. The method as claimed in claim 10, wherein the method further comprises storing, by the terminal device, in the hardware memory of the terminal device, third role information indicating (i) whether the role of the terminal device is the first role, and (ii) whether the role of the terminal device is the second role;

wherein the method further comprises changing, by the terminal device, the third role information stored in the hardware memory of the terminal device, within a period from start of sharing conference material with a plurality of terminal devices to the end of sharing the conference material, in response to an instruction for changing the role of the terminal device that the terminal device receives from the conference server apparatus;

wherein the determining, after the receiving of the questionnaire start order from the conference server apparatus, that the role of the terminal device itself is the first role or the second role, is performed by referencing the changed third role information.

18. An information processing system for conducting an electronic conference, the information processing system comprising:

a conference server apparatus including a first hardware processor and a first hardware memory that contains instructions that cause the first hardware processor to:

store, in the first hardware memory, conference material, questionnaire information indicating a questionnaire associated with the conference material, and screen data storage places; wherein the screen data storage places are dedicated for respective roles of the terminal devices; and control sharing of a displayed image among a plurality of terminal devices by sending the conference material, questionnaire information indicating the questionnaire which is associated with conference material and information indicating the screen data storage places to the terminal devices and distributing a display order for displaying the questionnaire information to the terminal devices;

receive a request for conference information from a terminal device;

send conference information to the terminal device in response to the request for conference information;

receive, from the terminal device, a request to participate in an electronic conference selected at the terminal device;

the terminal device, which includes a display, a second hardware processor, and a second hardware memory that contains second instructions that cause the second hardware processor to:

send, to the conference server apparatus, the request for conference information;

receive the conference information sent from the conference server apparatus in to the request for conference information;

display, on the display, a list of electronic conferences created from the received conference information;

send, to the conference server apparatus, a request to participate in an electronic conference selected at the terminal device from the displayed list of electronic conferences;

receive questionnaire information from the conference server apparatus through an established communication session, the received questionnaire information including (i) first role information that associates a first role played by one or more terminal devices to first information that indicates a storage place for questionnaire summary screen data; and (ii) second role information that associates a second role played by one or more terminal devices to second information that indicates a storage place for questionnaire answer screen data;

receive a questionnaire start order from the conference server apparatus through the established communication session;

determine, after receiving the questionnaire start order from the conference server apparatus, that a role of the terminal device itself is the first role or the second role;

acquire, when the hardware processor determines that the role of the terminal device itself is the first role, the questionnaire summary screen data from the storage place for the questionnaire summary screen data, by referring to the first role information that associates the first role to the first information; and display the acquired questionnaire summary screen data on the display;

acquire, when the hardware processor determines that the role of the terminal device itself is the second role, the questionnaire answer screen data from the storage place for the questionnaire answer screen data, by referring to the second role information that associates the second role to the second information; and display the acquired questionnaire answer screen data on the display.

19. The information processing system as claimed in claim 18, wherein the second instructions cause the second hardware processor to store, in the hardware memory of the terminal device, third role information indicating (i) whether the role of the terminal device is the first role, and (ii) whether the role of the terminal device is the second role; and wherein the second instructions cause the second hardware processor to perform the determining, after the receiving of the questionnaire start order from the conference server apparatus, that the role of the terminal device itself is the first role or the second role, by referencing the third role information.

20. The information processing system as claimed in claim 18, wherein the first instructions cause the first hardware processor to send, to the first terminal, an instruction for changing the role of the terminal device;

wherein the second instructions cause the second hardware processor to store, in the hardware memory of the terminal device, third role information indicating (i) whether the role of the terminal device is the first role, and (ii) whether the role of the terminal device is the second role;

wherein the second instructions cause the second hardware processor to change the third role information stored in the second hardware memory of the terminal device, within a period from start of sharing conference material with a plurality of terminal devices to the end of sharing the conference material, in response to the instruction for changing the role of the terminal device, which the terminal device receives from the conference server apparatus;

wherein the second instructions cause the second hardware processor to perform the determining, after the receiving of the questionnaire start order from the conference server apparatus, that the role of the terminal device itself is the first role or the second role, by referencing the changed third role information.

* * * * *